United States Patent
Sevindik

(10) Patent No.: US 12,120,654 B2
(45) Date of Patent: Oct. 15, 2024

(54) METHODS AND APPARATUS FOR MANAGING SPECTRUM ALLOCATION IN WIRELESS NETWORKS

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/432,024

(22) Filed: Feb. 4, 2024

(65) Prior Publication Data

US 2024/0215002 A1    Jun. 27, 2024

Related U.S. Application Data

(63) Continuation of application No. 17/343,385, filed on Jun. 9, 2021, now Pat. No. 11,895,635.

(51) Int. Cl.
| | |
|---|---|
| *H04W 72/04* | (2023.01) |
| *H04W 8/24* | (2009.01) |
| *H04W 16/14* | (2009.01) |
| *H04W 72/0453* | (2023.01) |
| *H04W 72/23* | (2023.01) |
| *H04W 72/563* | (2023.01) |

(52) U.S. Cl.
CPC ......... *H04W 72/0453* (2013.01); *H04W 8/24* (2013.01); *H04W 16/14* (2013.01); *H04W 72/23* (2023.01); *H04W 72/563* (2023.01)

(58) Field of Classification Search
CPC ............ H04W 16/14; H04W 72/0453; H04W 72/23; H04W 72/51; H04W 72/563; H04W 8/24
USPC ......................................................... 370/329
See application file for complete search history.

(56) References Cited

U.S. PATENT DOCUMENTS

| | | | |
|---|---|---|---|
| 9,699,663 B1* | 7/2017 | Jovancevic | G01S 7/021 |
| 2021/0168804 A1* | 6/2021 | Cimpu | H04W 16/14 |
| 2022/0039101 A1* | 2/2022 | Wang | H04W 52/0206 |
| 2022/0240259 A1* | 7/2022 | Sevindik | H04W 72/541 |
| 2022/0240304 A1* | 7/2022 | Wang | H04W 28/16 |

* cited by examiner

*Primary Examiner* — Robert J Lopata
(74) *Attorney, Agent, or Firm* — Straub & Straub; Stephen T. Straub; Michael P. Straub

(57) ABSTRACT

Methods and apparatus for managing spectrum in a wireless communications system. In an exemplary method embodiment, a wireless base station: (i) receives user equipment capability information from a first user equipment device; (ii) determines whether to allocate licensed or unlicensed spectrum to the first user equipment device based on the received user equipment capability information; and (iii) communicates a first spectrum allocation grant to the first user equipment device identifying the allocated spectrum for use by the first user equipment device. In various embodiments, the licensed and unlicensed spectrum are divided into bandwidth parts that are scored or ranked based on the quality and/or quantity of the spectrum bandwidth part.

20 Claims, 21 Drawing Sheets

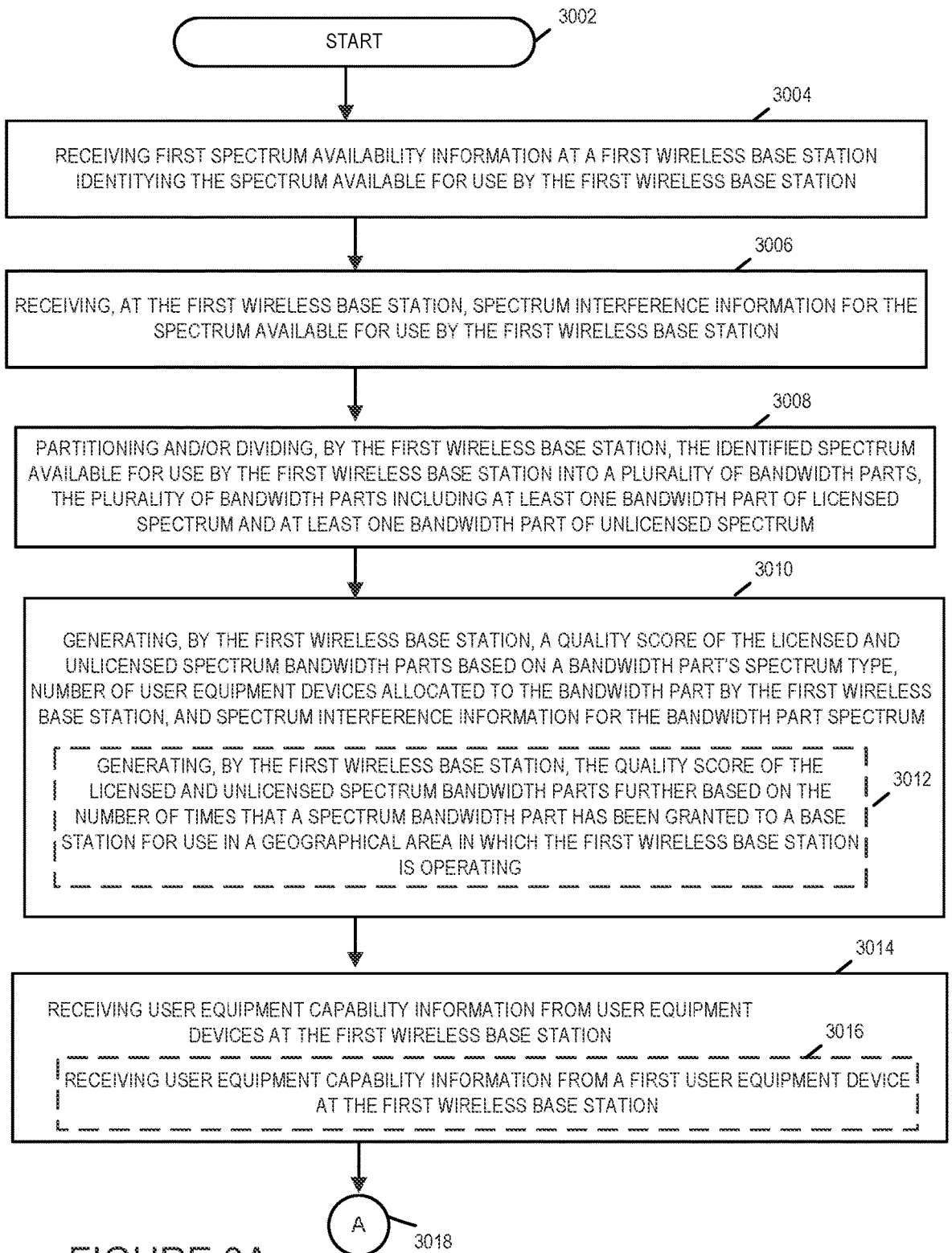

METHODS AND APPARATUS FOR MANAGING SPECTRUM ALLOCATION IN WIRELESS NETWORKS

RELATED APPLICATIONS

The present application is a continuation of U.S. patent application Ser. No. 17/343,385 which was filed on Jun. 9, 2021 and published as U.S. Patent Application Publication No. US 2022-0400487 A1 on Dec. 15, 2022. The aforementioned application is hereby expressly incorporated by reference in its entirety.

FIELD OF INVENTION

The present invention relates to methods and apparatus for managing spectrum allocation in wireless networks. Various features of the present invention relate to methods and apparatus for allocating licensed and unlicensed spectrum to mobile terminals also referred to herein as user equipment devices. Other features relate to methods and apparatus for allocating spectrum which has been divided or segmented into bandwidth parts to user equipment devices.

BACKGROUND OF THE INVENTION

In a wireless network, wireless base stations (e.g., Citizens Broadband Radio Service Devices (CBSDs) in Citizen Broadband Radio Service (CBRS) networks) serve as access points which can support wireless communications with mobile terminals also referred to herein as user equipment devices (UEs). In some such wireless networks there are multiple tiers defining what frequency spectrum bands may be used and the amount of interface that the users may cause. In the CBRS wireless network for example there are three tiers. Tier 1 is an incumbent access tier. Tier 2 is a Priority Access Tier. Tier 3 is General Authorized Access tier. The Priority Access tier consists of Priority Access Licenses (PALs) that are licensed by the government to operate in a specific geographic area. With respect to the CBRS wireless system the Priority Access Licenses are on a county-by-county basis. Each PAL consisting of a 10 megahertz channel within the 3550-3650 MHz band. While the Priority Access Licenses must protect and accept interference from Incumbent Access users such as for example, authorized federal users in the 3550-3700 MHz band and Fixed Satellite Service (space-to-Earth) earth stations in the 3600-3650 MHz band, the Priority Access Licenses receive protection from General Authorized Access (GAA) users. The General Authorized Access tier is licensed-by-rule to permit open, flexible access to the band with the intent of allowing access to the widest possible group of potential users. While the GAA users are permitted to operate throughout the 3550-3700 MHz band, GAA users must not cause harmful interference to Incumbent Access users or Priority Access Licensees. Furthermore, GAA users must accept interference from the Incumbent Access users and the Priority Access Licensees. Moreover, GAA users have no expectation of interference protection from other GAA users.

In various instances, wireless service operators operate in a geographic area as both PAL users and GAA users in which they utilize both licensed PAL spectrum and unlicensed open GAA spectrum. PAL spectrum is licensed and there is a cost associated with the PAL license. The PAL licensed spectrum is high quality since the PAL spectrum is clean in terms of excess interference. As previously mentioned, the PAL spectrum is protected from interference from the GAA users. Furthermore, many wireless service providers are implementing there CBRS wireless networks as 5G (3rd Generation Partnership Project fifth generation wireless networks). Currently, in 5G networks or spectrum also referred to as bandwidth is allocated by wireless base stations to each user equipment device regardless of whether that spectrum is licensed (e.g., CBRS PAL spectrum) or unlicensed (e.g., CBRS GAA spectrum).

Wireless service operators utilizing both PAL and GAA spectrum in the same geographic area are currently faced with the technological problem of how to utilize PAL and GAA spectrum with very high utilization rates.

Some wireless networks, such as for example, CBRS networks, often include one or more wireless base stations (e.g., Citizens Broadband Radio Service Devices (CBSDs)) with overlapping coverage areas in which multiple wireless service operators can operate. A wireless service operator's wireless base stations (e.g., CBSDs) are used to provide services to subscribers' user equipment devices. GAA spectrum is granted to each of these wireless base station (e.g., CBSDs) using a centralized resource allocation management device or system. In the CBRS network the resource allocation management device is called the Spectrum Access System (SAS). The resource allocation management device, e.g., Spectrum Access System in a CBRS network, is a central processing and database system that receives and processes spectrum grant requests. In such wireless networks, e.g., CBRS network, interference is managed through power management of wireless base station devices (e.g., CBSD devices) by the resource allocation management device, e.g., the Spectrum Access System (SAS). The resource allocation management device (e.g., SAS) stores information regarding which wireless base station (e.g., CBSD) uses how much spectrum at which location in the wireless network, e.g., CBRS network. When a specific amount of GAA spectrum is granted to a particular wireless base station (e.g., CBSD) with a specific transmission power, the resource allocation management device (e.g., SAS) calculates the coverage of this wireless base station (e.g., CBSD) by using a pre-determined path-loss model. The resource allocation management device (e.g., SAS) manages monitors and manages the interference caused by the different wireless base stations and adjusts the transmission power of the different wireless base stations to minimize the interference while maximizing the utilization of the limited frequency spectrum which is available. In some instances, the SAS grants one or more blocks of GAA spectrum to a wireless service operator or provider for a particular area or location such as a county or city and the service operator or provider operates a plurality of base stations in the particular area or location using the granted spectrum and any PAL spectrum the service operator or provider has licensed for the area or location.

From the above it should be understood that there is a need for new and/or improved methods and apparatus for using different tiers of spectrum in wireless systems more efficiently and effectively. Furthermore, there is a need to determine when to allocate licensed vs. unlicensed spectrum to user equipment devices to optimize the use of a wireless service operator or provider's spectrum. Additionally, there is a need for new and/or improved methods and apparatus for efficiently managing wireless spectrum to maximize the quality of service provided to subscribers. Furthermore, there is a need to solve the technological problem of how to utilize both PAL and GAA spectrum in the same geographic area with very high utilization rates. There is a further need for new and/or improved methods and apparatus for assigning and/or allocating bandwidth parts based on user equipment type or terminal type and/or traffic types in order to improve the quality of service being provided by a service operator/provider and/or maximize the efficiency of the use of the available bandwidth.

SUMMARY OF THE INVENTION

The present invention relates to methods and apparatus for managing spectrum allocation in wireless networks. Various features of the present invention relate to methods and apparatus for allocating licensed and unlicensed spectrum to and among user equipment devices. Other features relate to methods and apparatus for allocating spectrum which has been divided or segmented into bandwidth parts to user equipment devices. Various embodiments of the present invention solve one or more of the problems discussed above.

In explaining the various features of the invention they will be discussed in the context of examples where the base stations are 5G CBSD devices in a CBRS network connected to a 5G core network. However, such examples are to facilitate understanding of the invention and it should be appreciated that the methods and apparatus are not limited to CBRS embodiments, wireless base stations which are CBSDs, or resource allocation management devices which are CBRS Spectrum Access Systems. Consider for example that the methods and apparatus can be used for other wireless systems which utilize different tiers of spectrum, licensed and unlicensed bandwidth, and/or bandwidth parts in the allocation and utilization of spectrum for communicating between base station/access points and user equipment devices.

By using one or more of the techniques described herein a wireless base station (e.g., Citizens Broadband Radio Service Device, Wi-Fi base station, 5G network base station, gNB) can more efficiently and effectively manage and utilize network spectrum than prior methods. This is an important objective for wireless service providers, equipment manufacturers and government regulator agencies such as for example the United States Federal Communications Commission (FCC). More efficient management and usage of the wireless (e.g., CBRS) network spectrum including more efficient allocations of resources, e.g., frequency bandwidth allocations, results in, among other things, improved quality of servicer and/or optimizations of bandwidth/spectrum usage for user equipment device and/or cost efficiencies for wireless service providers. For example, service providers can in some instances make determinations as to which spectrum bandwidth parts should be assigned to which user equipment devices to maximize use of its licensed and unlicensed spectrum while meeting its quality of service agreements with its subscribers.

An exemplary communications method in accordance with an embodiment of the present invention includes the steps of: receiving user equipment capability information at a first wireless base station from a first user equipment device; determining, by the first wireless base station, whether to allocate licensed or unlicensed spectrum to the first user equipment device based on the received user equipment capability information; and communicating a first spectrum allocation grant to the first user equipment device identifying the allocated spectrum for use by the first user equipment device.

In some embodiments, prior to determining whether to allocate licensed or unlicensed spectrum to the first user equipment device based on the received user equipment capability information, the communications method includes the step of receiving first spectrum availability information at the first wireless base station identifying the spectrum available for use by the first wireless base station.

In various embodiments, the communications method further includes the step of dividing, by the first wireless base station, the identified spectrum available for use by the first wireless base station into a plurality of bandwidth parts, said plurality of bandwidth parts including at least one bandwidth part of licensed spectrum and at least one bandwidth part of unlicensed spectrum. Each bandwidth part of said plurality of bandwidth parts identifies a different contiguous set of resource blocks.

In some embodiments, the first spectrum availability information includes the identification of spectrum bandwidth parts available for use by the first wireless base station, each of said spectrum bandwidth parts identifying a contiguous set of resource blocks. In some such embodiments, the first spectrum availability information includes both a licensed spectrum bandwidth part and an unlicensed spectrum bandwidth part.

In various embodiments the first wireless base station and first user equipment device are part of a wireless network which supports bandwidth parts.

In some embodiments, the first wireless base station is a Citizens Broadband Radio Service Device (CBSD) which is part of a Citizen Broadband Radio Service (CBRS) network being operated by a first service provider, the licensed spectrum is Priority Access License (PAL) spectrum licensed to said first service provider, and the unlicensed spectrum is General Authorized Access (GAA) spectrum granted for use by a Spectrum Access System of the CBRS network with which the first wireless base station registered.

In various embodiments, the step of determining, by the first wireless base station, whether to allocate licensed or unlicensed spectrum to the first user equipment device based on the received user equipment capability information further includes determining which licensed or unlicensed bandwidth part spectrum is available for use by the first wireless base station to allocate to the first user equipment device based on a first user equipment capability score and a quality score of the licensed and unlicensed bandwidth part spectrum.

In some embodiments, the user equipment capability information includes one or more of the following: user equipment device type, user equipment device power requirement, dominant traffic type consumed by user equipment device, user equipment hardware capability, user equipment software capability, user equipment device throughput capability, and user equipment device latency requirement.

In some embodiments, the user equipment capability information includes a user equipment device category from which one or more user equipment capabilities can be derived. In some such embodiments, the one or more user equipment capabilities include one or more of the following: (i) user equipment device type, (ii) user equipment device power requirements, (iii) user equipment device hardware capability, (iv) user equipment device software capabilities, (v) dominant traffic type consumed by the user equipment device, (vi) throughput capability of the user equipment device, (vii) latency requirements of the user equipment device.

In various embodiments, the user equipment device type includes: (i) mobile phone type, (ii) appliance type (e.g., smart home device—thermostat, refrigerator, washer, dryer, television, security system), vehicle, laptop, tablet, smartphone, and computer.

In various embodiments, the user equipment device power requirements include a high power requirement, a mid-power power requirement, and a low power requirement. In some such embodiments, the low power requirement is a power requirement below a first threshold, the high power requirement is a power requirement above a second threshold and a mid-power requirement is a power requirement equal to or greater than the first threshold and less than or equal to the second threshold.

In various embodiments, the user equipment device hardware capability includes one or more of the following capabilities: (i) single CPU hardware device, (ii) multi-core CPU hardware device, (iii) single Digital Signal Processing device, (iv) multi-core Digital Signal Processing device, (v) single Graphics Processing Unit device, and (vi) multi-core Graphics Processing Unit device, (vii) device hardware release or version.

In various embodiments, the user equipment software capability includes one or more of the following: software release or version, type of operating system (e.g., iOS, android, release and/or version of device's operating system.

In various embodiments, the user equipment throughput capability includes: high throughput demand, mid-throughput demand, and low throughput demand. In some such embodiments, the low throughput demand is a throughput demand below a first throughput threshold, said high throughput demand is a throughput demand above a second throughput threshold and a mid-throughput demand is a throughput demand equal to or greater than the first throughput threshold and less than or equal to the second throughput threshold.

In various embodiments, the user equipment latency requirement capability includes a set of latency requirements defined by a set of thresholds which categorize very strict latency requirement devices, strict latency requirement devices, normal latency requirement devices, low latency requirement devices.

In some embodiments, the communications method includes the step of: generating, by the first wireless base station, the first user equipment capability score based on the user equipment capability information received from the first user equipment device. The first user equipment capability score is a weighted factor sum of values assigned to each of the first user equipment device capabilities included in the user equipment capability information. In some embodiments, the step of generating the first user equipment capability score based on the user equipment capability information received from the first user equipment device includes performing the following summation: W1 user equipment capability 1+W2 user equipment capability 2+W3 user equipment capability 3+W4 user equipment capability 4; wherein user equipment capability 1 is a numerical value assigned to the first user equipment capability included in the user equipment capability information received from the first user equipment device and wherein W1 is a numerical value weighting factor assigned for the first user equipment capability; wherein user equipment capability 2 is a numerical value assigned to the second user equipment capability included in the user equipment capability information received from the first user equipment device and wherein W2 is a numerical value weighting factor assigned for the second user equipment capability; wherein user equipment capability 3 is a numerical value assigned to the third user equipment capability included in the user equipment capability information received from the first user equipment device and wherein W3 is a numerical value weighting factor assigned for the third user equipment capability; wherein user equipment capability 4 is a numerical value assigned to the fourth user equipment capability included in the user equipment capability information received from the first user equipment device and wherein W4 is a numerical value weighting factor assigned for the fourth user equipment capability; and wherein the user equipment capability information includes at least four user equipment device capabilities.

In various embodiments, the communications method includes the step of: generating, by the wireless base station, a quality score of the licensed and unlicensed spectrum bandwidth parts based on a bandwidth part's spectrum type, number of user equipment devices allocated to the bandwidth part by the first wireless base station, and spectrum interference information for the bandwidth part spectrum.

In some embodiments the quality score of the licensed and unlicensed bandwidth parts is further based on the number of times that a spectrum bandwidth part has been granted to a base station for use in a geographical area in which the first wireless base station is operating (e.g., by a SAS device (PAL licenses are not granted by SAS devices and are therefore more valuable than GAA granted spectrum as they have less interference due to less base stations using the spectrum, the second most valuable are GAA spectrum that have the lowest number of grants to wireless base stations as that indicates there are less base stations using the spectrum and therefore less interference.

In some embodiments, the communications method includes the step of: receiving, at the first wireless base station, spectrum interference information for the spectrum available for use by the first wireless base station.

In various embodiments, prior to communicating the first spectrum allocation grant to the first user equipment device identifying the allocated spectrum for use by the first user equipment device, the wireless base station performs the operations of: (i) allocating bandwidth part spectrum for use by the first user equipment device based on rankings of available spectrum, said available spectrum having been segmented into separate bandwidth parts of contiguous resource blocks and the ranking of the first user equipment device based on the user equipment capability information, and (ii) sending bandwidth part configuration information to the user equipment device. The step of allocating bandwidth part spectrum for use by the first user equipment device based on rankings of available spectrum which has been segmented into separate bandwidth parts of contiguous resource blocks and the user equipment capability information received in some embodiments includes: matching user equipment capability information for the first user equipment device to a bandwidth part spectrum based on the ranking of the bandwidth part spectrum.

In some embodiments, the ranking of said bandwidth part spectrum is based on spectrum type of bandwidth part, amount of spectrum included in the bandwidth part, number of user equipment devices to which the bandwidth part has been allocated by the wireless base station, spectrum interference information for the bandwidth part. In some embodiments, the spectrum type is priority access license bandwidth type and general authorized access bandwidth type; and the bandwidth part spectrum of priority access license bandwidth type is ranked higher than general authorized access bandwidth type. In some embodiments the step of ranking the bandwidth parts of the spectrum available for use by the first wireless base station includes normalizing different spectrum bandwidth parts when spectrum bandwidth parts of different sizes (e.g., 10 MHz PAL spectrum vs. 20 MHz GAA spectrum) are available for use.

The present invention is also applicable to apparatus and system embodiments wherein one or more devices implement the steps of the method embodiments. In some apparatus embodiments each of the wireless base stations, CBSDs, user equipment devices, mobile terminal, resource allocation management devices, SAS devices, Session Management Function devices, Policy Control Function devices, and each of the other apparatus/devices/nodes of the system include one or more processors and/or hardware circuitry, input/output interfaces including receivers and transmitters, and a memory. The memory including instructions when executed by one or more of the processors control the apparatus/device of the system to operate to perform the steps and/or functions of various method embodiments of the invention.

The present invention is also applicable to and includes apparatus and systems such as for example, apparatus and systems that implement the steps and/or functions of the method embodiments. For example, a communication system in accordance with one embodiment of the present invention includes a wireless base station including: a memory, and a processor that controls the wireless base station to perform the following operations: receiving user equipment capability information from a first user equipment device; determining whether to allocate licensed or unlicensed spectrum to the first user equipment device based on the received user equipment capability information; and communicating a first spectrum allocation grant to the first user equipment device identifying the allocated spectrum for use by the first user equipment device.

In some embodiments, the processor further controls the wireless base station to perform the additional operation of: prior to determining whether to allocate licensed or unlicensed spectrum to the first user equipment device based on the received user equipment capability information, receiving first spectrum availability information at the first wireless base station identifying the spectrum available for use by the first wireless base station.

In some embodiments, the processor further controls the wireless base station to perform the additional operation of: dividing, by the first wireless base station, the identified spectrum available for use by the first wireless base station into a plurality of bandwidth parts, said plurality of bandwidth parts including at least one bandwidth part of licensed spectrum and at least one bandwidth part of unlicensed spectrum. In some embodiments, each bandwidth part of said plurality of bandwidth parts identifies a different contiguous set of resource blocks. In some embodiments, the first spectrum availability information includes the identification of spectrum bandwidth parts available for use by the first wireless base station, each of said spectrum bandwidth parts identifying a contiguous set of resource blocks. In some embodiments, the first spectrum availability information includes both a licensed spectrum bandwidth part and an unlicensed spectrum bandwidth part.

In various embodiments, the wireless base station is part of a wireless network and the first user equipment device which supports bandwidth parts.

In some embodiments, the wireless base station is a Citizens Broadband Radio Service Device (CBSD) which is part of a Citizen Broadband Radio Service (CBRS) network being operated by a first service provider, and the licensed spectrum is Priority Access License (PAL) spectrum licensed to said first service provider; and the unlicensed spectrum is General Authorized Access (GAA) spectrum granted for use by a Spectrum Access System of the CBRS network with which the first wireless base station registered.

In some embodiments, the operation of determining, by the wireless base station, whether to allocate licensed or unlicensed spectrum to the first user equipment device based on the received user equipment capability information further includes determining which licensed or unlicensed bandwidth part spectrum which is available for use by the wireless base station to allocate to the first user equipment device based on a first user equipment capability score and a quality score of the licensed and unlicensed bandwidth part spectrum. The user equipment capability information, may and in some embodiments does, include one or more of the following: user equipment device type, user equipment device power requirement, dominant traffic type consumed by user equipment device, user equipment hardware capability, user equipment software capability, user equipment device throughput capability, and user equipment device latency requirement.

The present invention is also directed to non-transitory computer readable medium embodiments. In an exemplary non-transitory computer readable medium, the non-transitory computer readable medium includes a first set of computer executable instructions which when executed by a processor of a wireless base station cause the wireless base station to perform the steps of: receiving user equipment capability information from a first user equipment device; determining whether to allocate licensed or unlicensed spectrum to the first user equipment device based on the received user equipment capability information; and communicating a first spectrum allocation grant to the first user equipment device identifying the allocated spectrum for use by the first user equipment device.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 3 illustrates the combination of FIGS. 3A and 3B.

FIG. 3A illustrates the steps of the first part of an exemplary method in accordance with one embodiment of the present invention.

DETAILED DESCRIPTION

Figure 1:
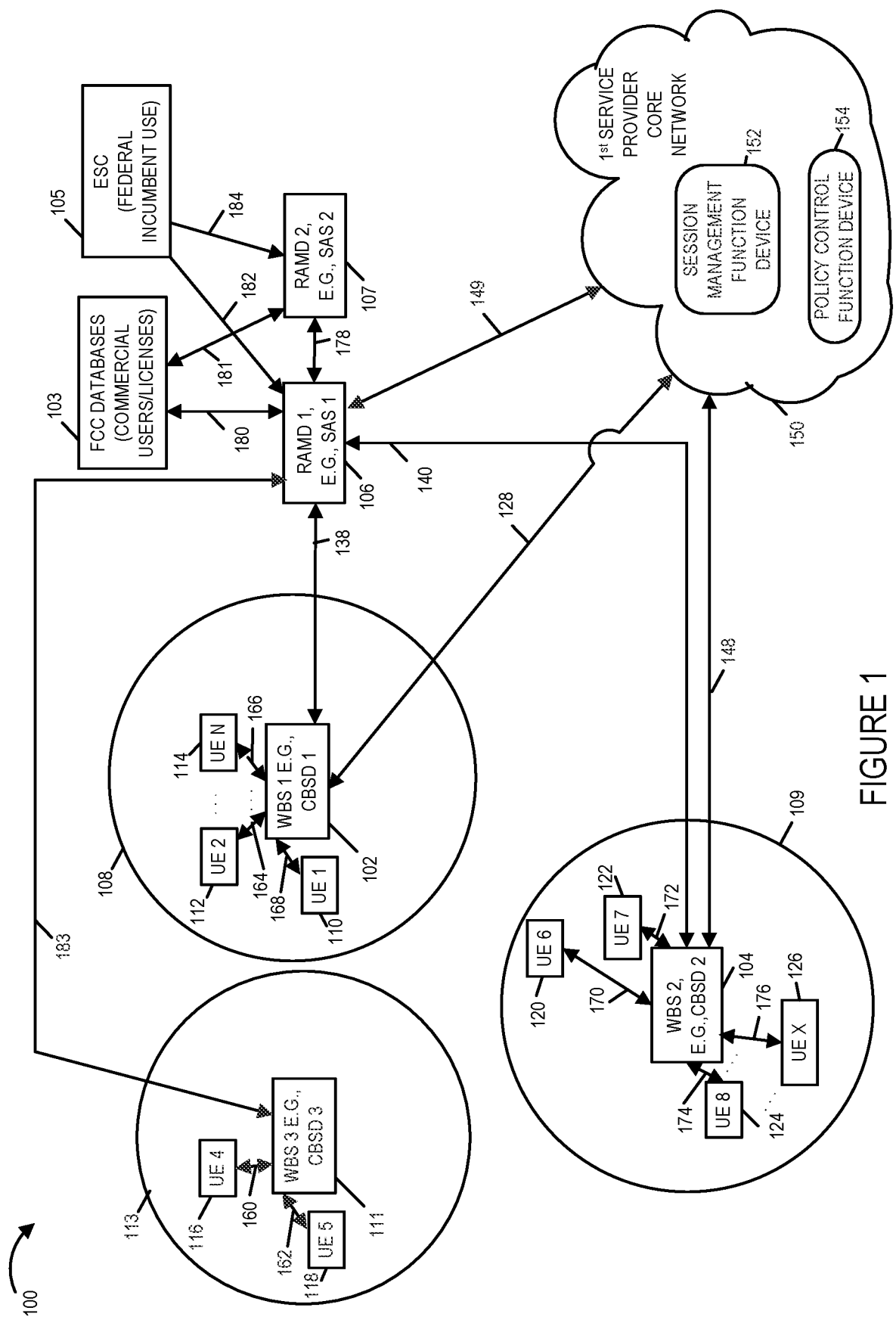
FIG. 1 illustrates an exemplary wireless network, e.g., Citizens Broadband Radio Service network, system 100 that provides wireless communications services in accordance one embodiment of the present invention.

The current invention is applicable to communications networks/systems such as for example, Citizens Broadband Radio Service (CBRS) networks and 50 networks, that provide wireless communications services. The present invention relates to methods, systems and apparatus that implement bandwidth management of wireless spectrum. In various embodiments, the bandwidth is separated into different types based on various metrics regarding the bandwidth characteristics, e.g., quality of the bandwidth such as interference, and then ranked. Bandwidth part allocation is then used utilized to allocate or assign the optimum bandwidth part to each wireless user terminal in the network by the wireless base station.

For explanatory purposes various features of the current invention will be explained using a 5G CBRS wireless network. However, as also explained above a CBRS wireless network is merely an exemplary wireless networks in which the invention may be implemented.

Citizens Broadband Radio Service networks are networks that include user equipment devices, e.g., mobile or wireless devices such as for example cell phones, smart phones, laptops, tablets, Citizens Broadband Radio Service Devices (CBSDs) which serve as access points/base stations, and Spectrum Access Systems which are resource allocation management devices that provide spectrum assignments and manage frequency interference through power management of the wireless base stations (CBSDs) transmission power. The Citizens Broadband Radio Service network utilizes 150 megahetz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes resource allocation management devices referred to as Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users such as the General Authorized Access users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

CBRS networks may be, and in many embodiments are, implemented in accordance with 5G network standards. 5G new radio covers a first frequency range from 410 MHz to 7.125 GHz and a second frequency range from 24.25 GHz to 52.6 GHz. The first frequency range is inclusive of the CBRS frequency spectrum range discussed above.

Currently, in 5G networks bandwidth or spectrum is allocated or assigned to each user equipment device or mobile user device regardless of whether the spectrum is licensed or unlicensed. The 3GPP 5G network standards do not partition bandwidth based on traffic or user type. The 3GPP 5G standards however do have a bandwidth parts feature in which a set of contiguous resource blocks are configured in a channel bandwidth.

The 5G NR; Physical channels and modulation (3GPP TS 38.211 version 16.2.0 Release 16) specification which was released by ETSI (European Telecommunications Standards Institute in July 2020 is hereby incorporated by reference in its entirety. This specification describes the 5G New Radio feature of bandwidth parts.

As explained in the 3GPP TS 38.211 version 16.2.0 Release 16 specification section 4.4.5 a bandwidth part is a subset of contiguous common resource blocks defined for a given numerology on a given carrier. "A user equipment device (UE) can be configured with up to four bandwidth parts in the downlink with a single downlink bandwidth part being active at a given time. The UE is not expected to receive PDSCH, PDCCH, or CSI-RS (except for RRM) outside an active bandwidth part. A UE can be configured with up to four bandwidth parts in the uplink with a single uplink bandwidth part being active at a given time. If a UE is configured with a supplementary uplink, the UE can in addition be configured with up to four bandwidth parts in the supplementary uplink with a single supplementary uplink bandwidth part being active at a given time. The UE shall not transmit PUSCH or PUCCH outside an active bandwidth part. For an active cell, the UE shall not transmit SRS outside an active bandwidth part." The 3GPP TS 38.213 V16.5.0 (2021-03) 3rd Generation Partnership Project; Technical Specification Group Radio Access Network; NR; Physical layer procedures for control (Release 16) which is also herein incorporated by reference in its entirety further describes the operation of the bandwidth parts in 5G New Radio.

Bandwidth part allocation is in an important feature in 3GPP 5G standards, and its main purpose is to conserve the battery life of mobile devices.

Various embodiments of the present invention utilize the bandwidth parts feature to partition the bandwidth available to a wireless service operator in a geographical region into a plurality of different bandwidth parts. The different bandwidth parts are characterized and then allocated or assigned for use to different user equipment devices based on one or more factors including bandwidth part availability, bandwidth part characteristics, user equipment device characteristics, and/or communications session traffic type in order to improve the quality of service provided to the wireless operator's subscribers and make more efficient and effective use of the wireless operator's available bandwidth. The user equipment device characteristics include the device type, device version, operating system type, operating system version, software version, power requirements, hardware characteristics including hardware capabilities, latency requirements, throughput capabilities. The 3GPP TS 25.306 V16.1.0 (2020-09) 3rd Generation Partnership Project; Technical Specification Group Radio Access Network; UE Radio Access capabilities (Release 16) which was released in September 2020 includes a set of user equipment categories which in some embodiments used to determine various characteristics about a user equipment device which is being serviced by a wireless base station. The 3GPP TS 25.306 V16.1.0 (2020-09) 3rd Generation Partnership Project; Technical Specification Group Radio Access Network; UE Radio Access capabilities (Release 16) is hereby incorporated by reference in its entirety.

Figure 2:
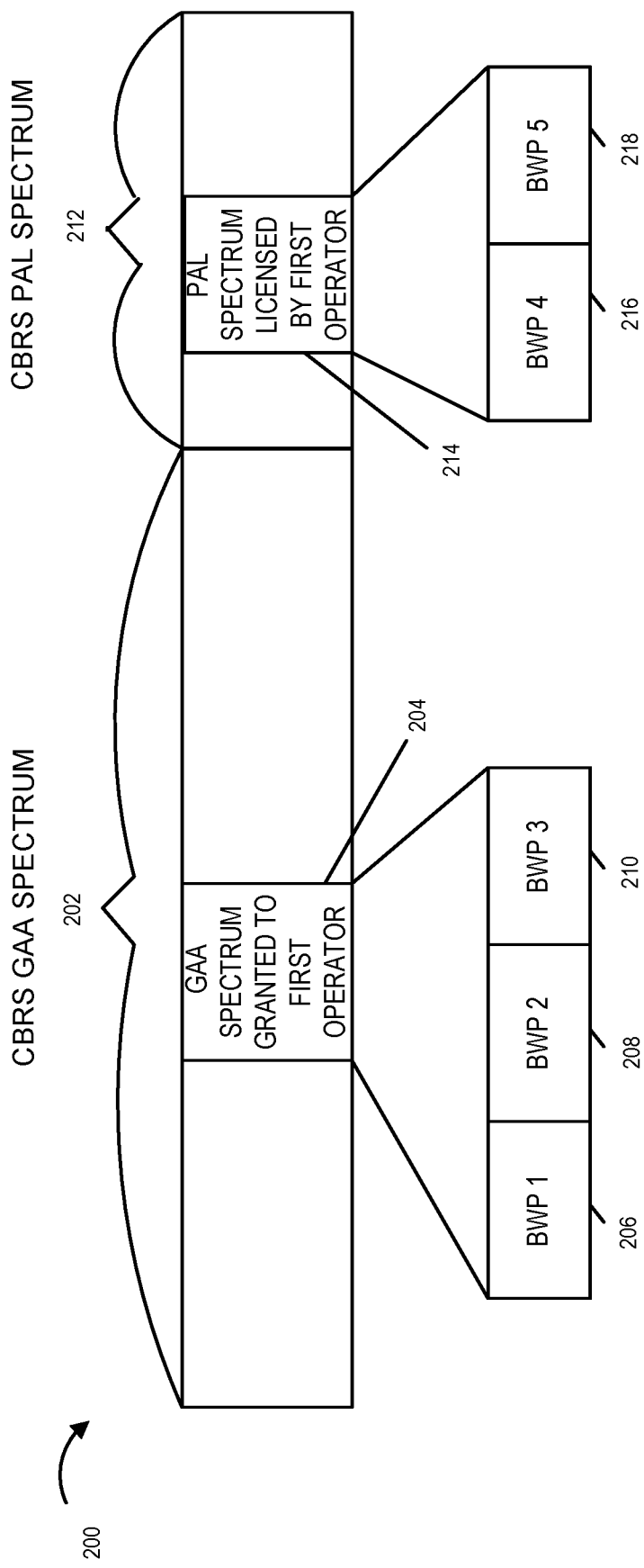
FIG. 2 illustrates a diagram of General Authorized Access Spectrum and Priority Access License Spectrum.

Diagram 200 of FIG. 2 illustrates General Authorized Access (GAA) Spectrum and Priority Access License (PAL) Spectrum. CBRS GAA Spectrum 202 includes the GAA spectrum chunk 204 granted to the first wireless operator/service provider for a first geographical area, e.g., when a wireless base station located in the first geographical area, e.g., CBSD, belonging to the first wireless operator/service provider registers with the Spectrum Access System. CBRS PAL spectrum 212 includes the PAL spectrum 214 licensed by the first wireless operator/service provider in the first geographical area. The GAA spectrum granted to the first wireless operator/service provider has been segmented/divided/partitioned into three bandwidth parts—bandwidth part 1 (BWP 1) 206, bandwidth part 2 (BWP 2) 208, and bandwidth part 3 (BWP 3) 210. The PAL spectrum licensed by the first wireless operator/service provider has been divided/segmented/partitioned into two bandwidth parts—bandwidth part 4 (BWP 4) 216 and bandwidth part 5 (BWP 5) 218. The first wireless operator/service provider's wireless base station in the first geographical area can utilize all of these different bandwidth parts to provide wireless services to user equipment devices. The present invention describes methods, apparatus and system for scoring, ranking and/or prioritizing the bandwidth parts of the available different tiers of spectrum (e.g., GAA tier spectrum (which is unlicensed spectrum) and PAL tier spectrum (licensed spectrum)) and scoring, ranking and/or prioritizing user equipment devices capabilities and usage so as to be able to find an optimal or best fit match between user equipment devices' capabilities and usages and the available bandwidth part spectrum.

Figure 11:
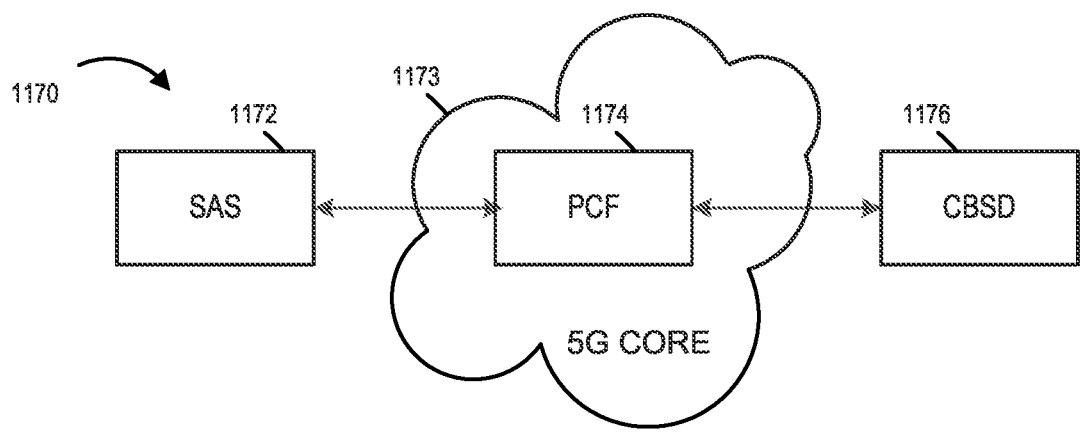
FIG. 11 illustrates an exemplary system in accordance with an embodiment of the present invention.

A high level discussion of the invention will now be presented in connection with FIGS. 11, 12, 13 and 14. Diagram 1170 of FIG. 11 illustrates an exemplary system in accordance with an embodiment of the present invention. Spectrum Access System 1172 communicates spectrum grant information to a Policy Control Function device 1174 located in a 5G core network 1173 of a first service provider upon the registration of the CBSD 1176 which is also operated by the first service provider. The spectrum grant information identifies General Availability Access spectrum or bandwidth which the CBSD 1176 may use for providing wireless services to user equipment devices. The Spectrum Access System 1172 also provides spectrum interference information to the Policy Control Function device 1174. The Policy Control Function device 1174 also contains information on the Priority Access License spectrum which the first service provider has licensed in the geographical area of the CBSD 1176. In some embodiments, the Policy Control Function 1174 obtained this information from the Spectrum Access System 1172 while in other embodiments it is obtained from a database which includes this information. The Policy Control Function 1174 hence has knowledge of both the General Authorized Access (GAA) spectrum and the Priority Access Licensed (PAL) spectrum which is available for use by the CBSD 1176. The Policy Control Function device 1174 communicates information identifying the PAL spectrum and GAA spectrum available for use by the CBSD 1176 to the CBSD 1176. In some embodiments, the Policy Control Function device 1174 divides or partitions the granted GAA spectrum or licensed PAL spectrum which may be, and sometimes is granted or licensed as a large block of spectrum, into smaller portions or blocks of spectrum. In some embodiments, the Policy Control Function device 1174 then ranks the partitioned or divided spectrum portions based on characteristics of the spectrum portions such as interference, e.g., use the spectrum interference information provided by the Spectrum Access System 1172.

Figure 13:
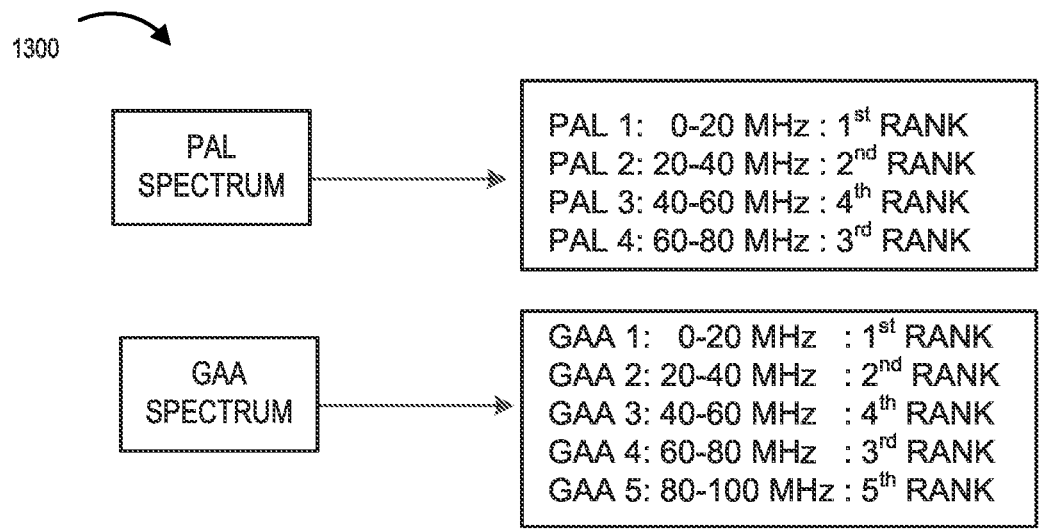
FIG. 13 illustrates Priority Access License spectrum which has been divided or partitioned into 20 MHz portions and ranked and General Authorized Access spectrum which has been divided or partitioned into 20 MHz portions and ranked in accordance with an embodiment of the present invention.

Diagram 1300 of FIG. 13 illustrates Priority Access License spectrum which has been divided or partitioned into 20 MHz portions and ranked and General Authorized Access spectrum which has been divided or partitioned into 20 MHz portions and ranked in accordance with an embodiment of the present invention. Apportionment of the General Authorized Access spectrum may occur at the Spectrum Access System 1172, the Policy Control Function device 1174 and/or the CBSD 1176, i.e., each of these devices may perform some form of apportionment of the General Authorized Access spectrum which has been granted the CBSD 1176 to communicate with the user equipment devices it is servicing. With respect to the PAL spectrum the Policy Control Function device 1174 and/or the CBSD 1176 perform the apportionment of the PAL spectrum. In diagram 1300 of FIG. 1300, 80 MHz of PAL spectrum has been licensed by the first service provider. This chunk of 80 MHz of spectrum has been sub-divided or partitioned in four 20 MHz portions or chunks. PAL 1: 0-20 MHZ, PAL 2: 20-40 MHz, PAL 3: 40-60 MHz and PAL 4: 60-80 MHz. 0 MHz being the starting point of the 80 MHz of PAL licensed spectrum with the other MHz values being offsets. In diagram 1300 of FIG. 1300, also shown is 100 MHz of GAA spectrum which has been granted for use for first service provider's CBSD 1176. This chunk of 100 MHz of spectrum has been sub-divided or partitioned in five 20 MHz portions or chunks. GAA 1: 0-20 MHz, GAA 2: 20-40 MHZ, GAA 3: 40-60 MHZ, GAA 4: 60-80 MHz and GAA 5: 80-100 MHz. 0 MHz being the starting point of the 100 MHz of GAA granted spectrum with the other MHz values being offsets. Diagram 1300 of FIG. 13 also shows the ranking of the different portions of PAL spectrum and GAA spectrum. In this diagram the PAL and GAA spectrum have been ranked separately. In some embodiments, the PAL and GAA spectrum portions are not ranked separately, i.e., a single spectrum ranking list is generated for all spectrum portions regardless of whether the spectrum portion is a PAL spectrum portion or a GAA spectrum portion. In various embodiments, the spectrum portions are ranked by the CBSD 1176 which receives the GAA spectrum grant information, the PAL availability information and spectrum interference information from the Policy Control Function device 1174. The ranking of the PAL spectrum chunks is performed so that the most valuable PAL spectrum chunks are the PAL spectrum chunks with the lowest interference and the smallest number of user equipment devices. The most valuable GAA spectrum chunks which are ranked the highest are the ones which have been granted the lowest number of times.

Figure 12:
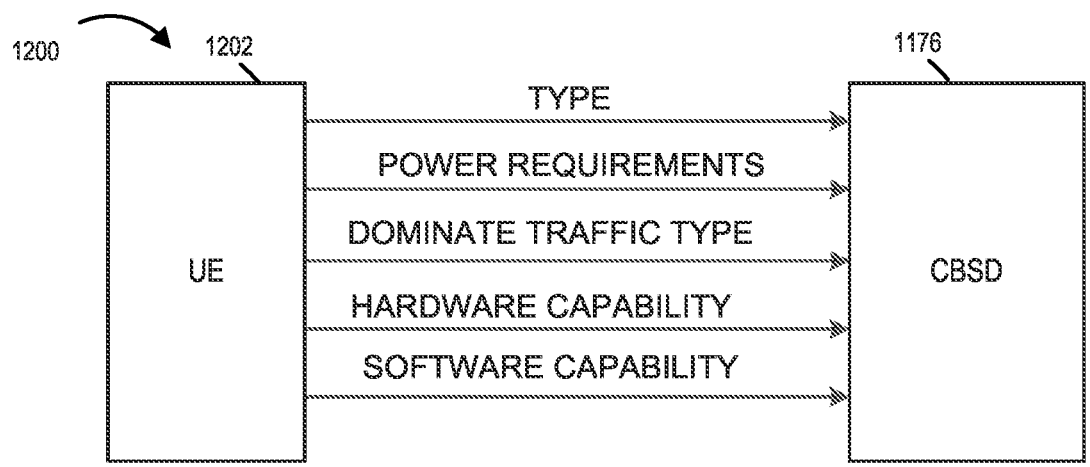
FIG. 12 illustrates a user equipment device providing user equipment capability information to a wireless base station shown as a CBSD in accordance with an embodiment of the present invention.

Diagram 1200 of FIG. 12 illustrates an exemplary user equipment device 1202 communicating its user equipment capability information to CBSD 1176. The user equipment capability information includes user equipment type, power requirements, dominate traffic type consumed by the user equipment device, hardware capability, and software capability.

Figure 14:
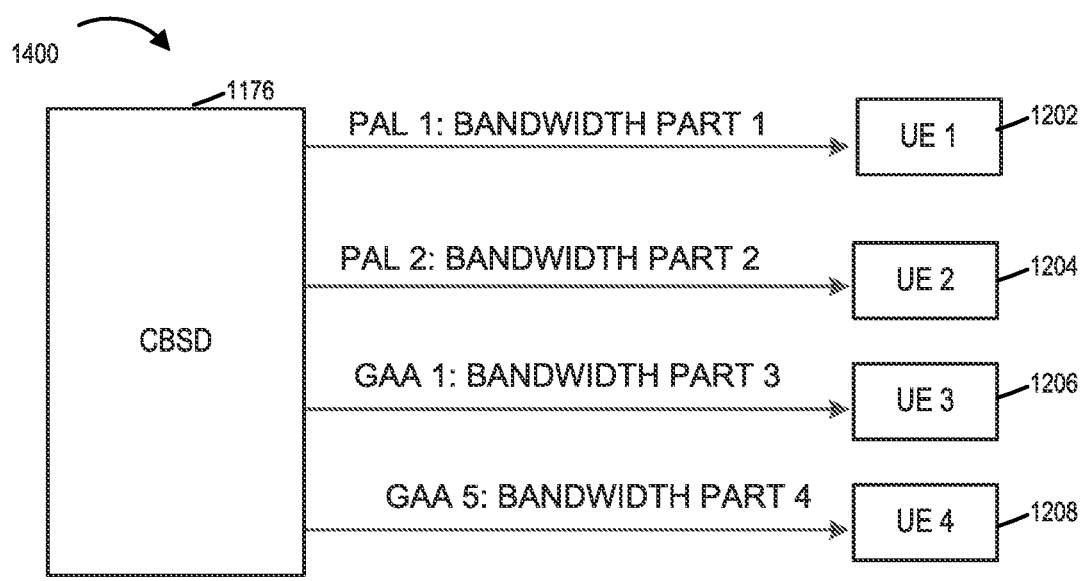
FIG. 14 illustrates a wireless base station which is a CBSD which communicates allocated different spectrum bandwidth parts to a plurality of user equipment devices.

Diagram 1400 of FIG. 14 illustrates how CBSD 1176 allocating bandwidth part spectrum to user equipment devices UE 1 1202, UE 2 1204, UE 1206, and UE 1208. The bandwidth part spectrum is allocated based on the user equipment capability information received from each of the user equipment devices UE 1, UE 2, UE 3, and UE 4 and the ranking of the bandwidth spectrum portions. The CBSD 1176 matching each user equipment device's user equipment capabilities to the best fit or optimal bandwidth part spectrum. A bandwidth part being a contiguous set of resource blocks. The CBSD communicates the allocated spectrum bandwidth part to each of the user equipment devices. PAL 1: Bandwidth Part 1 is allocated and communicated to UE 1 1202. PAL 2: Bandwidth part 2 is allocated and communicated to UE 2 1204. GAA 1: Bandwidth part 3 is allocated and communicated to UE 3 1206. GAA 5: Bandwidth part 4 is allocated and communicated to UE 4 1208.

A more detailed discussion of the various system, method and apparatus embodiments of the present invention will now be discussed.

FIG. 1 illustrates an exemplary communications system 100 having an architecture implemented in accordance with the present invention. In this example the communications system includes a first service provider core network 150 and a 5G CBRS wireless network. The communications system 100 includes a plurality of wireless base stations (WBS 1 (e.g., Citizens Broadcast Radio Service Device (CBSD) 1 102, WBS 2 (e.g., CBSD 2) 104, and WBS 3 (e.g., CBSD 3) 111), a resource allocation management device (RAMD 1)(e.g., Spectrum Access System device 1 (SAS 1)) 106, a RAMD 2 (e.g., SAS 2) 107, databases of commercial users/licenses (e.g., an FCC Database) 103, an Environmental Sensing Capability (e.g., Federal Incumbent Use) (ESC)) system 105, a plurality of user equipment (UE) devices UE 1 110, UE 2 112, ..., UE N 114, UE 4 116, UE 5 118, UE 6 120, UE 7 122, UE 124, ..., UE X 126, communications links 128, 138, 140, 160, 162, 164, ..., 166, 168, 170, 172, 174, ..., 176, 178, 180, 181, 182, 184, a first cell 108 illustrating the first base station's 102 coverage area, a second cell 109 illustrating the second base station's 104 coverage area, and a third cell 113 illustrating the third base station's 111 coverage area.

The first cell 108 of the network is serviced by the WBS 1 (e.g., CBSD 1) 102. The first cell 108 illustrates the wireless coverage range of WBS 1 (e.g., CBSD 1) 102 at a first time T1. The user equipment devices also sometimes referred to as user terminal devices UE 1 110, UE 2 112, ..., UE N 114 (N being an integer greater than 2) are located in the first cell 108 and are in active wireless communications with WBS 1 (e.g., CBSD 1) 102. Communications links 168, 164, and 166 illustrate wireless communications channels, e.g., radio channels, over which WBS 1 (e.g., CBSD 1) 102 and UE 1 110, UE 2 112, ..., UE N 114 communicate respectively.

The second cell 109 of the wireless network is serviced by WBS 2 (e.g., CBSD 2) 104. The second cell 109 illustrates the wireless coverage range of WBS 2 (e.g., CBSD 2) 104 at the first time T1. The user equipment devices UE 6 120, UE 7 122, UE 8 124, ..., UE X 126 (X being an integer greater than 3) are located in a second cell 109 and are in communication with WBS 2 (e.g., CBSD 2) 104. Communications links 170, 172, 174, ..., 176 illustrate wireless communications channels, e.g., radio channels, over which WBS 2 (e.g., CBSD 2) 104 and UE 6 120, UE 7 122, UE 8 124, ..., UE X 126 communicate respectively.

The third cell 113 of the wireless network is serviced by WBS 3 (e.g., CBSD 3) 111. The third cell 113 illustrates the wireless coverage range of WBS 3 (e.g., CBSD 3) 111 at the first time T1. The user equipment devices UE 4 116 and UE 5 118 are located in a third cell 113 and are in communication with WBS 3 (e.g., CBSD 3) 111. Communications links 160, 162 illustrate wireless communications channels, e.g., radio channels, over which WBS 3 (e.g., CBSD 3) 111 and UE 4 116, UE 5 118, communicate respectively.

Resource Allocation Management Device (RAMD) 1 (e.g., SAS 1) 106 is coupled to Resource Allocation Management Device (RAMD) 2 (e.g., SAS 2) 107 via communications link 178. RAMD 1 (e.g., SAS 1) 106 is coupled to databases 103 via communications link 180. RAMD 2 (e.g., SAS 2) 107 is coupled to databases 103 via communications link 181. ESC system 105 is coupled to RAMD 1 (e.g., SAS 1) 106 and RAMD 2 (e.g., SAS 2) 107 via communications links 182 and 184. The ESC system is used to detect, sense Navy radar operations in the wireless bands utilized for communications in the wireless network, e.g., in CBRS networks the ESC detects or senses Navy radar operation within 3550-3650 MHz near the coasts, and provide notifications over the communications links to RAMD 1 (e.g., SAS 1) 106 and RAMD 2 (e.g., SAS 2) 107. RAMD 1 (e.g., SAS 1) 106 manages the WBS 1 (e.g., CBSD 1) 102, WBS 2 (e.g., CBSD 2) 104, and WBS 3 (e.g., CBSD 3) 111 spectrum allocation and transmission power to limit interference in the wireless network (e.g., CBRS wireless network). RAMD 2 (e.g., SAS 2) 107 manages other wireless base stations (e.g., CBSDs) in the wireless network which are not shown in FIG. 1. Resource Allocation Management Device 1 (e.g., SAS 1) 106 and Resource Allocation Management Device 2 (e.g., SAS 2) 107 communicate and share information regarding the wireless network coverage of the wireless base stations (e.g., CBSDs) each respectively manage and coordinate management of the allocation of spectrum and power transmission levels of wireless base stations (e.g., CBSDs) throughout the wireless network. While only two Resource Allocation Management Devices (e.g., SAS devices) are shown in FIG. 1 it should be understood that additional Resource Allocation Management Devices (e.g., SAS devices) are typically used in the wireless network (e.g., CBRS network). The WBS 1 102, WBS 2 104, and WBS 3 111 are coupled and/or connected to the RAMD 1 106 via communications links 138, 140, and 183 respectively. The RAMD 1 106 is coupled to the first service provider's core network via communications link 149.

WBS 1 102 is coupled and/or connected to the first service provider core network 150 via communications link 128. WBS 2 104 is coupled to first service provider core network 150 via communications link 148. WBS 1 102 and WBS 2 104 are owned and/or operated by the first service provider. WBS 3 111 is not owned or operated by the first service provider and is not connected to the first service provider's core network. WBS 3 111 is owned by a second service provider and is connected to the second service provider's core network 150 is not shown.

The nodes, devices and elements of the first service providers core network 150 are interconnected via a communications network including communications links which allow the various nodes, devices and elements of the first service providers core network 150 to communicate and exchange information and data.

The first service provider's core network 150 in this exemplary embodiment is a 5G network including a session management function device 152 and a policy control function device 154. The session management function device 152 includes at least a session management function but may, and in some embodiments does, include and/or perform other functions. The policy control function device 154 includes a policy control function but may, and in some embodiments does, include and/or perform other functions, e.g., a security gateway function. In some embodiments, the policy control function 154 and session management function 152 are implemented as nodes.

The communications links 128, 138, 140, 148, 149, 178, 180, 181, 182, and 183 as well as the communications links coupling together the elements of the core network 150 are typically wired communications links or fiber optic cables. The communications links 160, 162, 164, 166, 168, 170, 172, 174 and 176 are wireless or over the air communications links. It is to be understood that the communication links shown in system 100 are only exemplary and other network configurations and communications links may be employed that couple together the devices, servers, nodes, entities, databases and controllers of the system. Elements or steps with the same reference numbers used in different figures are the same or similar and those elements or steps will not be described in detail again.

While for the sake of simplicity in explaining the invention system 100 only illustrates three active wireless base stations (e.g., CBSD devices), two Resource Allocation Management Devices (e.g., SAS devices) and a few UE devices, it will be appreciated that system 100 typically includes a large plurality of active wireless base stations (e.g., CBSDs) in the wireless network supporting a large plurality of UE devices and being managed by a plurality of Resource Allocation Management Devices (e.g., SAS devices) which are in communication with one another. While the cell coverage areas of the different wireless base stations are not shown are overlapping their transmission still cause interference in the spectrum allocated to the wireless base station bases by the RAMD 1, e.g., SAS 1 106.

Figure 4:
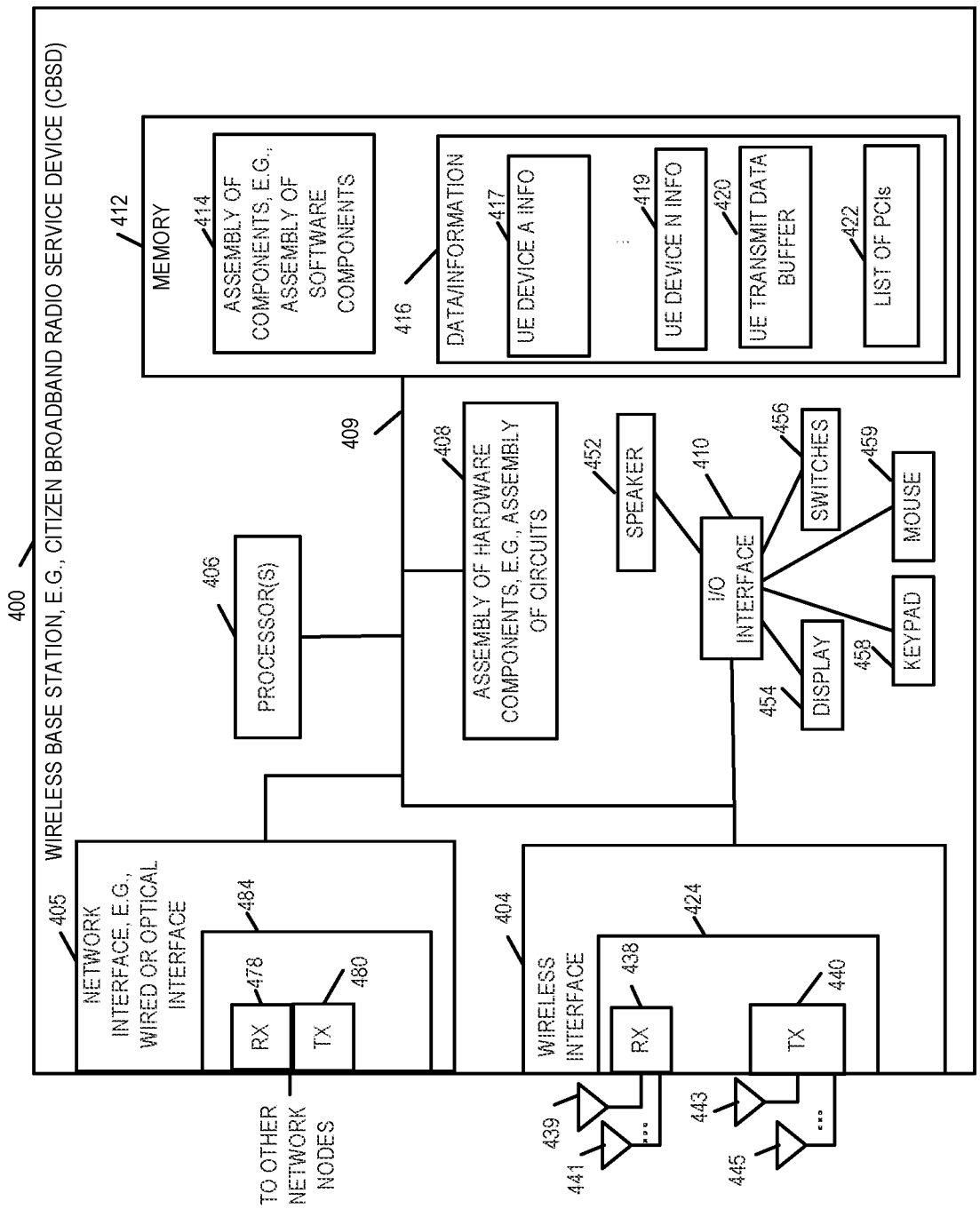
FIG. 4 illustrates details of an exemplary wireless base station (e.g., Citizens Broadband Radio Service Device (CBSD)) in accordance with one embodiment of the present invention.

FIG. 4 is a drawing of an exemplary wireless base station (WBS) (e.g., Citizens Broadband Radio Service Device (CBSD), Wi-Fi base station, LTE base station, 4G base station, 5G base station) 400 in accordance with an exemplary embodiment. The wireless base station device (e.g., CBSD device) 400, in some embodiments, incorporates Long Term Evolution (LTE), e.g., 4G LTE, eNodeB base station/access point capabilities such as determination of a user equipment device's timing advance and/or commands to request user equipment devices to report power headroom values. In some embodiments, the wireless base station (e.g., CBSD device) 400 also includes the capabilities of a CBSD as defined by the Federal Communications Commission's Rules with Regard to Commercial Operations in the 3550-3650 MHZ Band. Exemplary wireless base station (e.g., CBSD device) 400 includes a wireless interface 404, a network interface 405, e.g., a wired or optical interface, processor(s) 406 (one or more processors), e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 406, 408, 412) of the wireless base station 400. Network interface 405 includes a receiver 478 and a transmitter 480. In some embodiments, receiver 478 and transmitter 480 are part of a transceiver 484. Wireless interface 404 includes a wireless receiver 438 and a wireless transmitter 440. In some embodiments, receiver 438 and transmitter 440 are part of a transceiver 442. In various embodiments, wireless interface 404 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signal from other wireless communications devices including a second wireless communications device, e.g., a UE device. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., a UE device. Memory 412 includes an assembly of component 414, e.g., an assembly of software components, and data/information 416. Data/information 416 includes UE device information corresponding to a plurality of user equipment devices (UE device A information 417, . . . , UE device N information 419 where A to N are the UE devices being serviced by the wireless base station for example WBS 1 (e.g., CBSD 1) 102 UE 1 . . . UE 5 as shown in FIG. 1, UE transmit data buffer 420, and List of PCIs (Physical Cell Identifier List) 422. In some embodiments, WBS 1 (e.g., CBSD 1) 102 and/or WBS 2 (e.g., CBSD 2) 104, are implemented in accordance with wireless base station 400.

Figure 5:
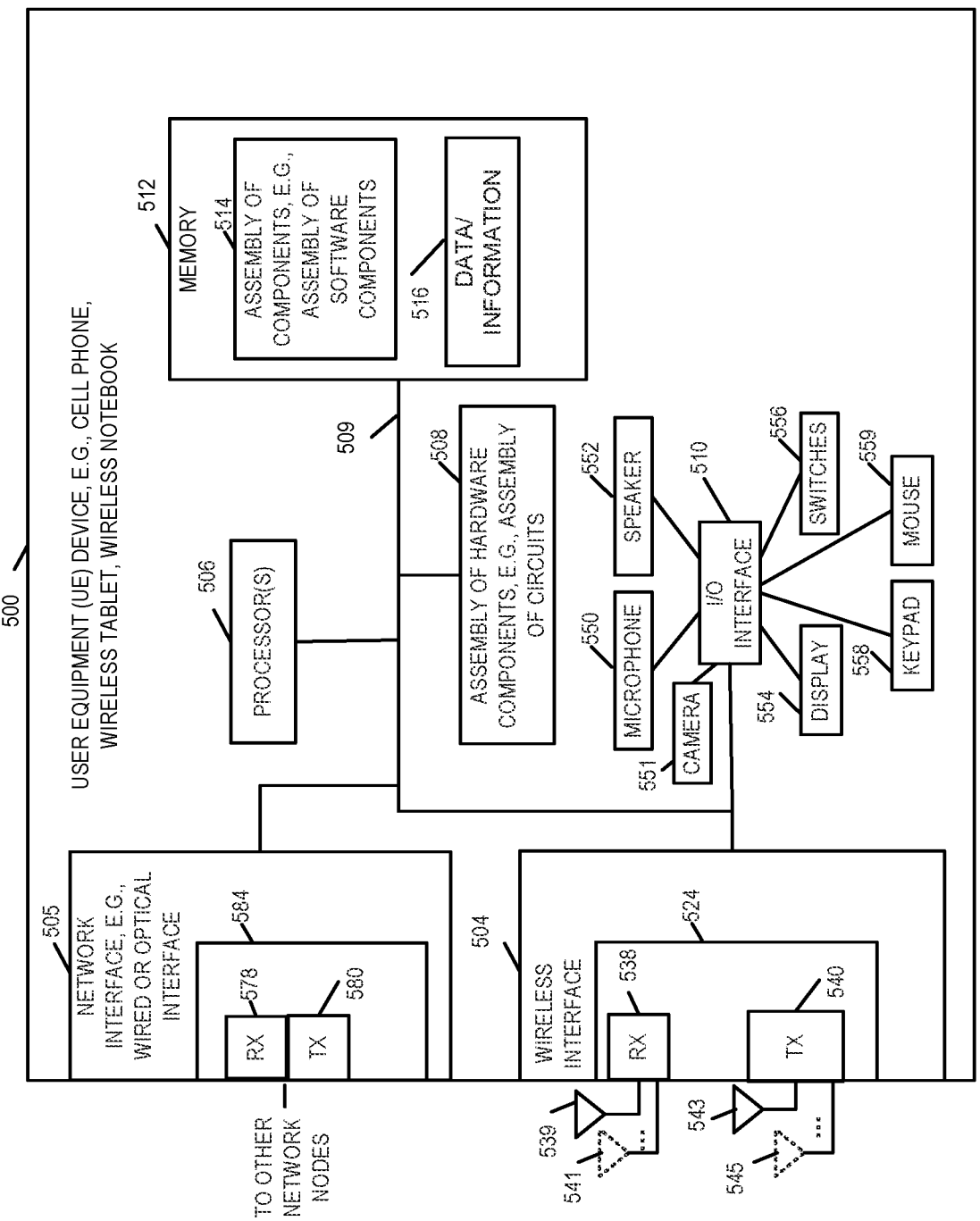
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a mobile device such as a cell phone, a smart phone, wireless tablet or wireless notebook. UE device 500, in some embodiments, includes Long Term Evolution (LTE), e.g., 4G LTE, mobile device capabilities. Exemplary UE device 500 includes a wireless interface 504, a processor(s) 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 506, 508, 512) of the UE device. Network interface 505 includes a receiver 578 and a transmitter 580. In some embodiments, receiver 578 and transmitter 580 are part of a transceiver 584. Wireless interface 504 includes a wireless receiver 538 and a wireless transmitter 540. In some embodiments, receiver 538 and transmitter 540 are part of a transceiver 524. In various embodiments, wireless interface 504 includes a plurality of wireless receivers and a plurality of wireless transmitters. Wireless receiver 538 is coupled to one or more receive antennas (receive antenna 1 539, . . . , receive antenna M 541), via which UE device 500 can receive wireless signals from other wireless communications devices including, e.g., a wireless base station such as wireless base station 400. Wireless transmitter 540 is coupled to one or more wireless transmit antennas (transmit antenna 1 543, . . . , transmit antenna N 545) via which the UE device 500 can transmit signals to other wireless communications device including a first wireless communications device, e.g., a wireless base station 400. Memory 512 includes an assembly of components 514, e.g., an assembly of software components, and data/information 516.

Figure 6:
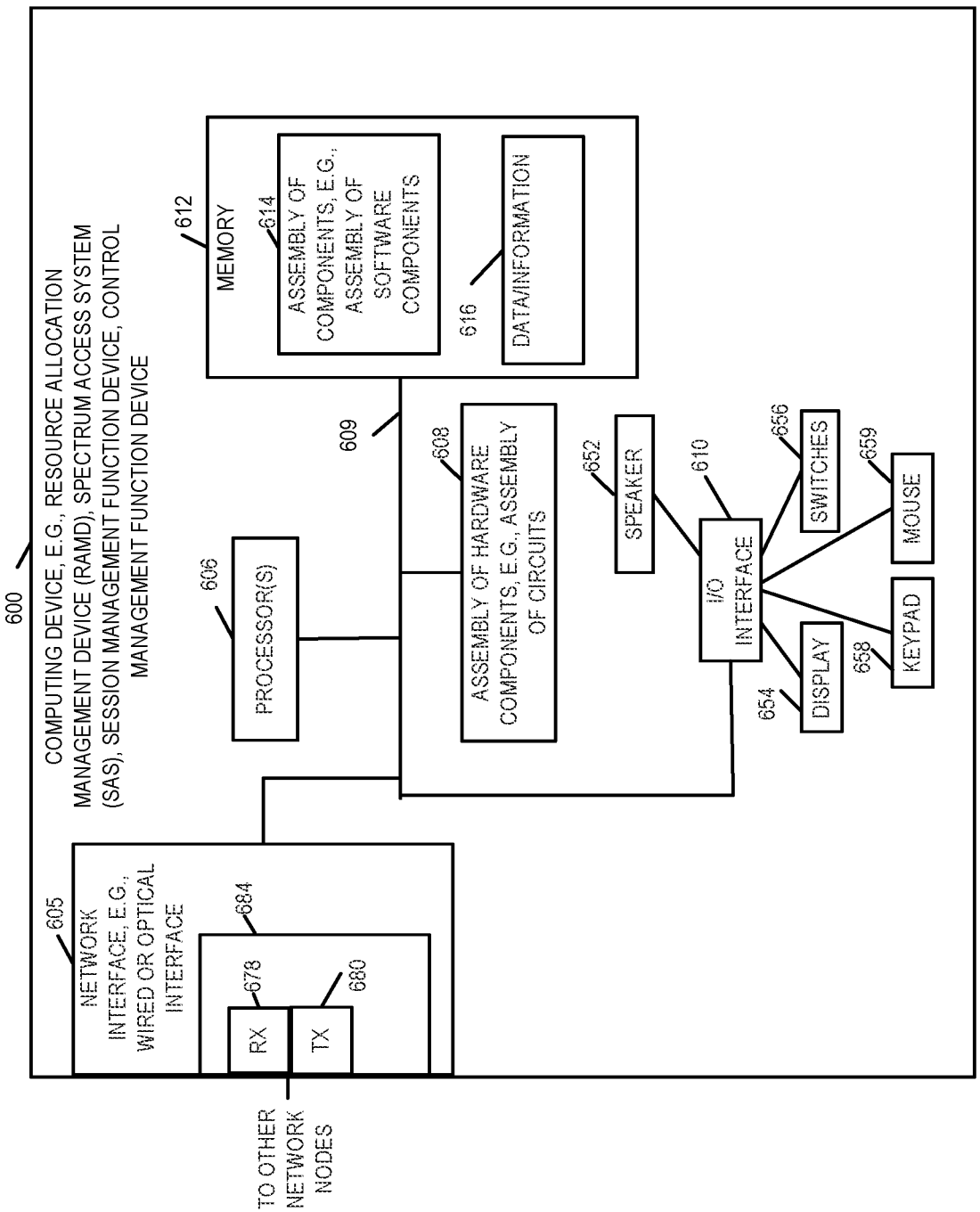
FIG. 6 illustrates details of an exemplary computing device, e.g., a resource allocation management device (e.g., Spectrum Access System device (SAS)), Session Management Function device, a Policy Control Function device in accordance with one embodiment of the present invention.

FIG. 6 is a drawing of an exemplary computing device such as a Resource Allocation Management Device (RAMD), e.g., a Spectrum Access System (SAS) device in a CBRS system), a session management function device, a policy control function device 600 in accordance with an exemplary embodiment. In some embodiments, when the computing device 600 is a Resource Allocation Management Device implemented as an SAS it includes the capabilities of a SAS as defined by the Federal Communications Commission's Rules with Regard to Commercial Operations in the 3550-3650 MHz Band. In some embodiments, when the computing device 600 is implemented as a session management function device it includes at least the capabilities of session management function as defined per 5G network standards. In some embodiments, when the computing device 600 is implemented as a policy control function device it includes at least the capabilities of policy control function as defined per 5 g network standards. The computing device 600 includes a network interface 605, e.g., a wired or optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The computing device 600 further includes a speaker 652, a display 654, switches 656, keypad 658 and mouse 659 coupled to I/O interface 610, via which the various I/O devices (652, 654, 656, 658, 659) may communicate with other elements (606, 608, 612) of the computing device 600. Network interface 605 includes a receiver 678 and a transmitter 680. The network interface 605 is typically used to communicate with other devices, e.g., other resource management devices, other devices in the network core and/or wireless base stations (e.g., CBSD devices). In some embodiments, receiver 678 and transmitter 680 are part of a transceiver 684. Memory 612 includes an assembly of component 614, e.g., an assembly of software components, and data/information 616. Data/information 616 typically includes spectrum allocation information for different wireless base stations of GAA spectrum and spectrum interference information when the computing device is a resource allocation management device such as an SAS. The data/information 616 includes spectrum availability information (e.g., licensed and unlicensed spectrum available for wireless base stations of a service provider) and spectrum interference information when the computing device is a policy control function. The data/information 616 may, and in some embodiments also includes spectrum bandwidth part rankings and assignments of spectrum to different wireless base stations. In some embodiments, resource allocation management devices, session management function devices and policy control function devices disclosed in the figures and/or discussed in connection with the various embodiments of the invention are implemented in accordance with computing device 600. For example, Resource Allocation Management Device 1 (e.g., SAS 1) 106, session management function device 152 and policy control device 154 of FIG. 1 are implemented in accordance with computing device 600.

Figure 7:
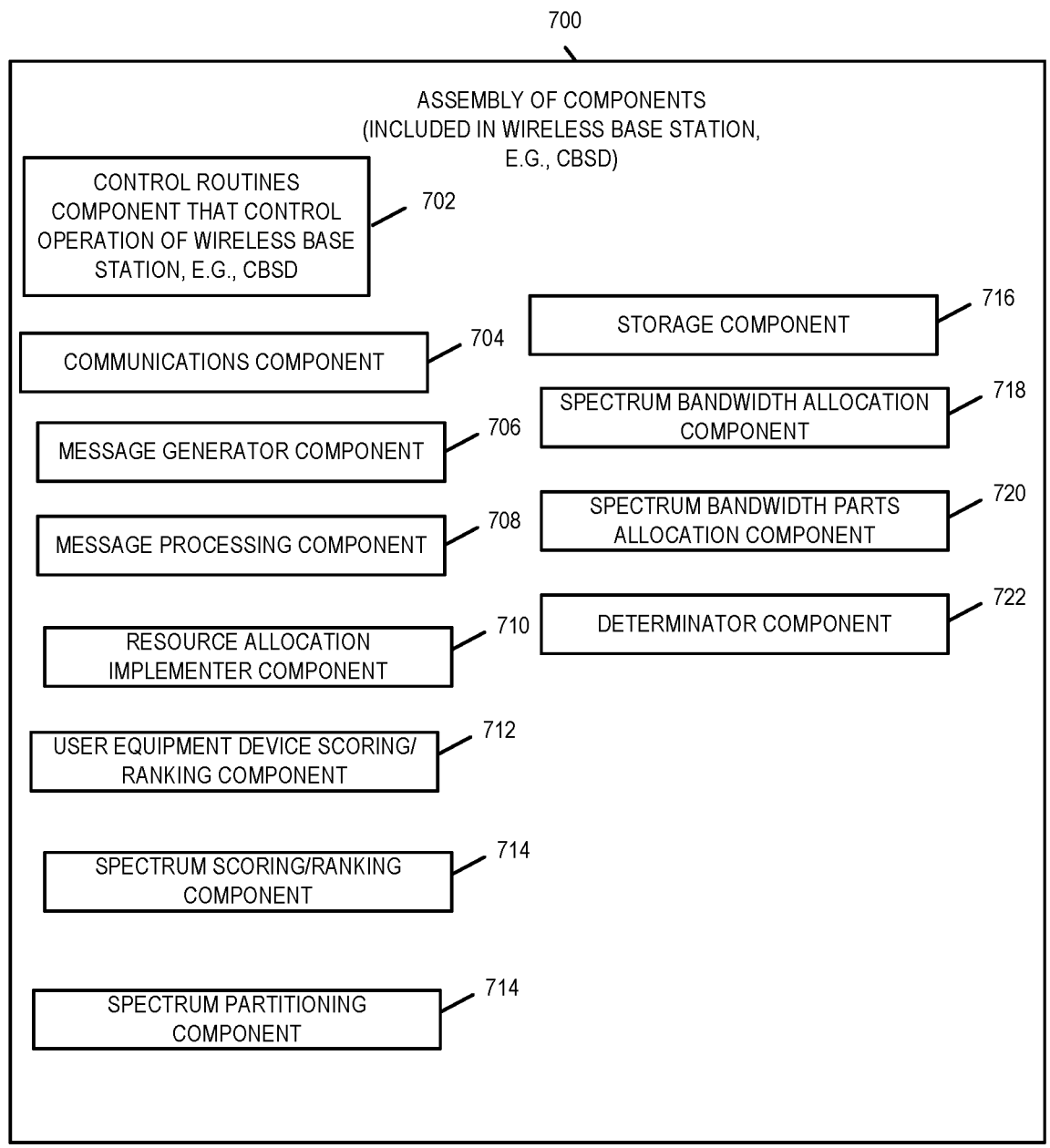
FIG. 7 illustrates an exemplary assembly of components for a wireless base station (e.g., CBSD) in accordance with an embodiment of the present invention.

FIG. 7 is a drawing of an exemplary assembly of components 700 which may be included in an exemplary wireless base station (e.g., exemplary wireless base station 400 of FIG. 4), in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a communications component 704, a message generator component 706, a message processing component 708, a resource allocation implementer component 710, a user equipment device scoring/ranking component 712, a spectrum ranking component 714, a spectrum partitioning component 714, a storage component 716, a spectrum bandwidth allocation component 718, a spectrum bandwidth parts allocation component 720, and a determinator component 722.

The control routines component 702 is configured to control operation of the wireless base station (e.g., CBSD). The communication component 704 is configured to handle communications, e.g., transmission and reception of messages, and protocol signaling for the wireless base station (e.g., CBSD). The message generator component 706 is configured to generate messages for transmission to other devices. The message processing component 708 is configured to process messages received from other devices, e.g., messages from user equipment devices including user equipment capability information, spectrum allocation messages from resource allocation management devices, SAS devices, session function management devices, policy control function devices.

The resource allocation implementer component 710 is configured to implement all aspects related to spectrum allocations to user equipment devices including for example determining spectrum allocations to user equipment devices, spectrum bandwidth part allocations to user equipment devices, spectrum apportionment, spectrum portion and/or spectrum bandwidth part rankings.

The user equipment device scoring/ranking component 714 is configured to determine scores and/or rankings of user equipment devices based on user equipment capability information received from the user equipment devices and/or derived from information obtained from interacting with the user equipment devices, e.g., monitoring how data is consumed by the user equipment devices for a period of time.

The spectrum scoring/ranking component 714 generates scores and/or ranks spectrum, e.g., based on type of spectrum, amount of spectrum, spectrum interference, number of user equipment devices to which spectrum has been allocated. The scoring/ranking component 714 also generates scores and/or ranks bandwidth parts and apportioned spectrum such as spectrum which has been separated, segmented, partitioned or divided into chunks.

The storage component 716 is configured to manage the store, and retrieval of data and/or instructions to/and from memory and/or storage device coupled and/or connected to the wireless base station.

The spectrum bandwidth allocation component 718 is configured to allocate bandwidth or spectrum to user equipment devices.

The spectrum bandwidth parts allocation component 720 is configured to allocate bandwidth parts to user equipment devices.

The determinator component 722 is configured to make determinations and decisions for the wireless base station including for example: i) determining the score and/or ranking of bandwidth, spectrum, bandwidth parts, portions of bandwidth or spectrum, scores for user equipment devices based on user equipment capabilities, (ii) determinations of a user equipment device's capabilities based on a user equipment device category reported by the user equipment device, (iii) determinations of a spectrum type based on spectrum bandwidth of the spectrum, (iv) determinations of allocations of bandwidth, spectrum, and/or bandwidth parts for user equipment devices based on one or more of the following: spectrum scores, spectrum/bandwidth ranking, spectrum interference, spectrum current usage and allocation to user equipment devices, spectrum type, bandwidth part spectrum scores, bandwidth part spectrum ranking, bandwidth part current usage by user equipment devices, user equipment capabilities of the user equipment devices, (v) determining whether to allocate licensed or unlicensed spectrum to a user equipment device based on user equipment capability information received from the user equipment device, (vi) determining which licensed or unlicensed bandwidth part spectrum which is available for use by the wireless base station to allocate to the user equipment device based on a user equipment capability score and a quality score of the licensed and unlicensed bandwidth part spectrum, (vi) determining whether to allocate available priority access licensed spectrum or available General Authorized Access spectrum to a user equipment device.

Figure 8:
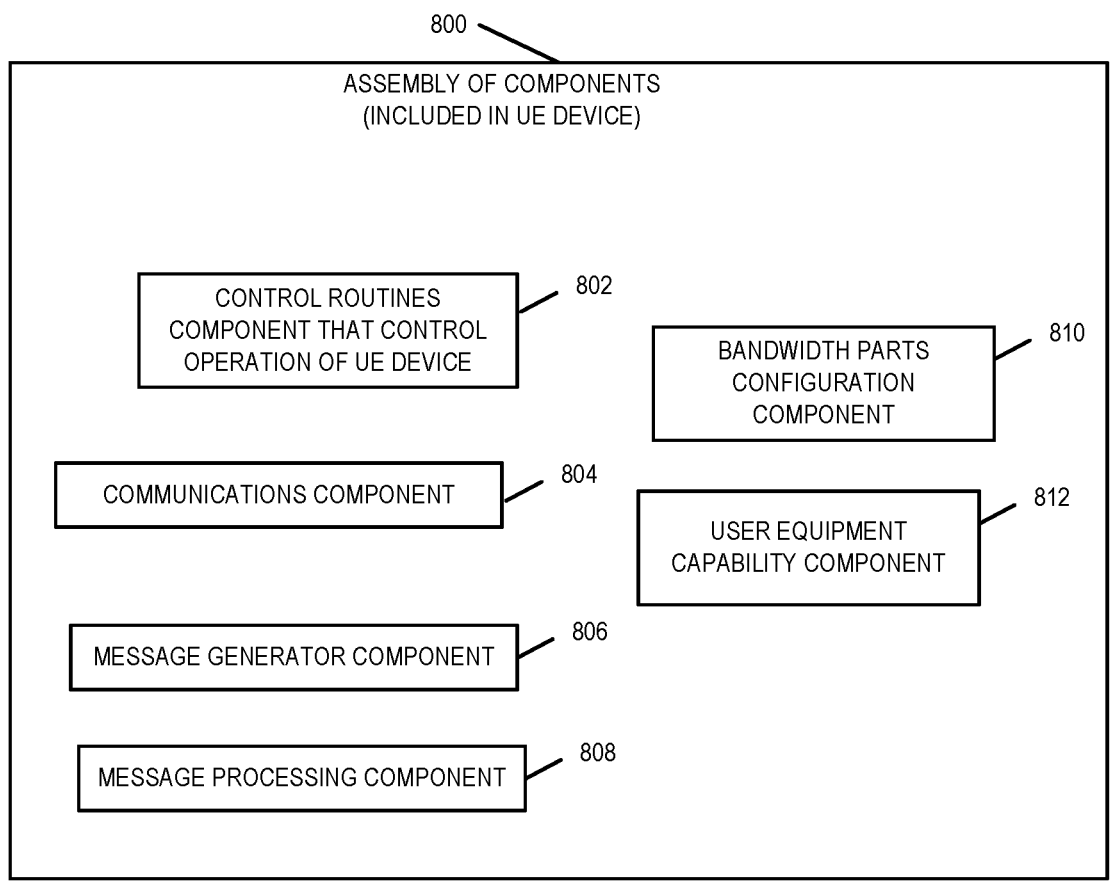
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808, a bandwidth parts configuration component 810, and a user equipment capability component 812.

Figure 9:
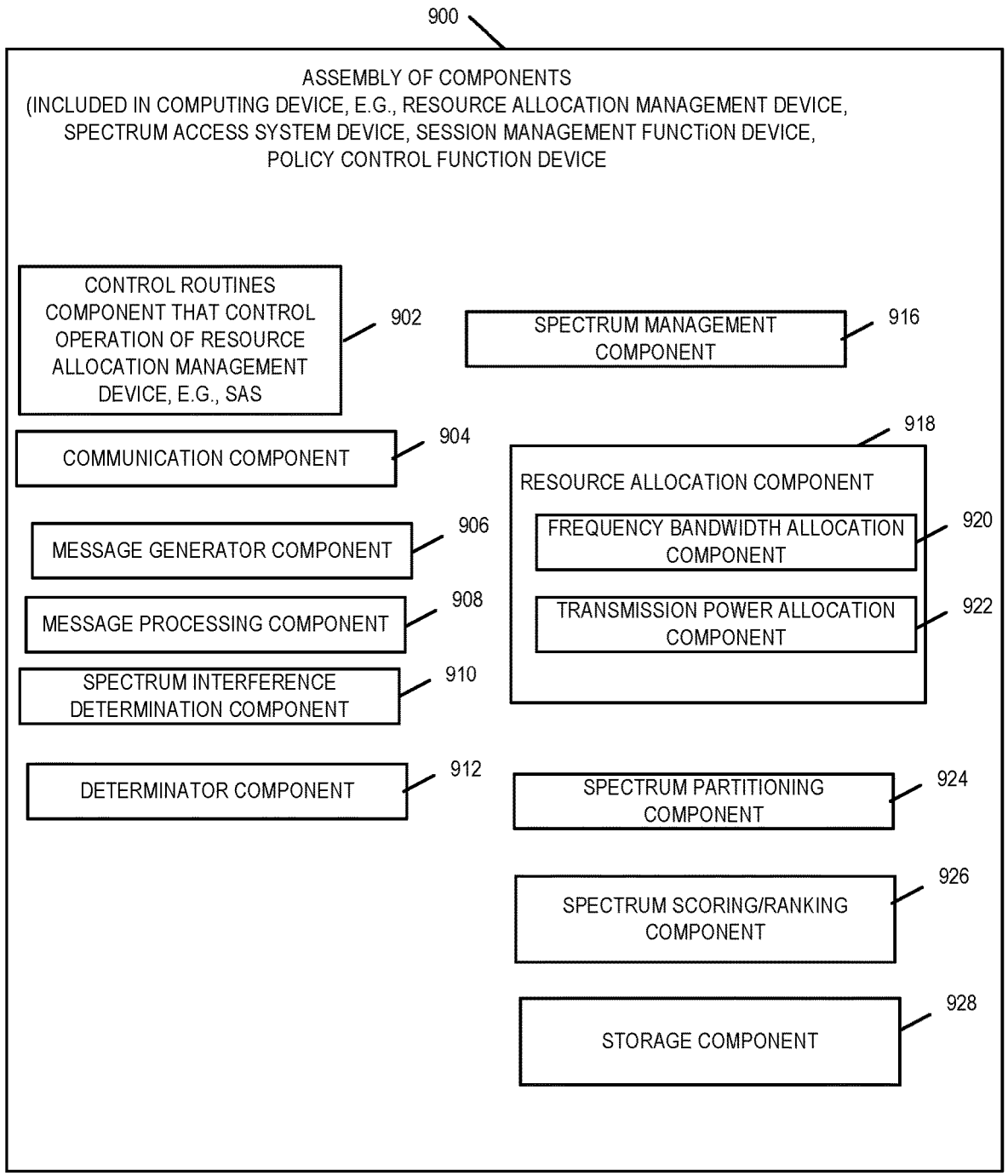
FIG. 9 illustrates an exemplary assembly of components for a computing device, e.g., a resource allocation management device (e.g., SAS device), a session management function device, a policy control function device in accordance with an embodiment of the present invention.

The control routines component 802 is configured to control operation of the UE. The communication component 804 is configured to handle communications, e.g., receipt and transmission of signals and provide protocol signal processing for one or protocols for the UE. The message generator component 804 is configured to generate messages for transmission to the wireless base stations (e.g., CBSD devices) such as messages including user equipment capability information of the user equipment device. In some embodiments, the message generator component is a sub-component of the communications component 804. The message processing component 808 processes received messages, e.g., requests for information such as user equipment capability information and bandwidth part configuration instructions/information. In some embodiments, the message processing component is a sub-component of the communications component 808. The bandwidth parts configuration component configuration the user equipment device to communicate with a wireless base station using bandwidth parts feature, e.g., 5G New Radio Bandwidth Parts feature. The user equipment capability component 812 identifies user equipment capabilities and/or features of the user equipment device and reports or communicates these capabilities and/or features to a wireless base station, e.g., a wireless base station to which the UE is attached and/or connected. The user equipment capabilities can be a user equipment category which identifies the user equipment capabilities. The user equipment capabilities and/or features can also include power requirements of the user equipment device, device type of the user equipment device, dominant traffic consumed by the user equipment device, model of the user equipment device, hardware capabilities (e.g., hardware release/version of user equipment device, number of CPUs, number of GPUs), software capabilities (e.g., software release/version, operating system), throughput capabilities, and latency requirements FIG. 9 is a drawing of an exemplary assembly of components 900 which may be included in a computing device, e.g., computing device 600 of FIG. 6, in accordance with an exemplary embodiment. The computing device may be implemented as an exemplary Resource Allocation Management Device (e.g., SAS device), Session Management Function device, or Policy Control Function device. Not all components need to be included in the computing device. The specific components which are included will be dependent on the computing devices implementation for example whether the computing device is implemented as an SAS or a Session Management Function device. In some embodiments, all of the components are included but only some components will be utilized depending on the functions being implemented by the device, e.g., session management function vs. policy control function. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the resource allocation management device 600, with the components controlling operation of resource allocation management device 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the computing device 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, a spectrum interference component 910, a determinator component 912, a spectrum management component 916, a resource allocation component 918, a spectrum partitioning component 924, a spectrum scoring/ranking component 926, and a storage component 928. The resource allocation component 918 includes in a frequency bandwidth allocation component 920 and a transmission power allocation component 922.

The control routines component 902 is configured to control operation of the computing device. The communication component 904 is configured to handle communications between the computing device and other nodes/devices, e.g., wireless base stations, session management function device, policy control function device, databases, ESC system including receipt and transmission of messages and protocol signaling. The message generator component 906 is configured to generate messages for transmission to other device, e.g., policy control function device, session management function device, resource allocation management device, wireless base stations (e.g., CBSD devices), e.g., resource allocations messages including frequency bandwidth allocated to a wireless base station (e.g., CBSD) and transmission power allocations for the wireless base station (e.g., CBSD). The message processing component 908 is configured to process messages received from other components, e.g., wireless base station registration messages, requests for bandwidth/spectrum allocation messages. The spectrum interference determination component 910 is configured to determine actual or potential spectrum interference to be caused by wireless, e.g., radio transmission from active wireless base stations (e.g., CBSD devices) or wireless base stations (e.g., CBSDs devices) which are to become active.

The determinator component 914 is configured to make one or more decisions or determinations such as for example, the score and/or ranking of a bandwidth portion, allocated spectrum, bandwidth part, determine spectrum allocations, and determine spectrum interference information.

The spectrum management component 916 is configured to manage the allocation of frequency spectrum in the wireless network including frequency bandwidth allocated to wireless base stations managed by the computing device, e.g., a resource allocation management device. In some embodiments, the spectrum management component 916 is a sub-component of resource allocation component 918.

The resource allocation component 918 is configured to allocate resources including for example frequency bandwidth allocations and/or transmission power allocations for wireless base stations (e.g., CBSDs) managed by the resource allocation management device (e.g., SAS) and based on estimations of the wireless base stations' (e.g., CBSDs') coverage area. In some embodiments, the resource allocation component 918 includes sub-components frequency bandwidth allocation component 920 and transmission power allocation component 922. The frequency bandwidth allocation component 920 is configured to allocate frequency bandwidth for a wireless base station (e.g., CBSD) based on the estimated coverage area of the wireless base station (e.g., CBSD). The transmission power allocation component 922 is configured to allocate transmission power to a wireless base station (e.g., CBSD) based on the estimated coverage area of the wireless base station (e.g., CBSD).

The spectrum partitioning component 924 is configured to partition, segment or divide spectrum or bandwidth into a plurality of portions and/or bandwidth parts.

The spectrum scoring/ranking component 926 is configured score and/or spectrum/bandwidth, e.g., spectrum bandwidth parts or portions of spectrum/bandwidth which has been partitioned and/or segmented.

The storage component 928 is configured to store, retrieve and maintain data in memory and/or a storage device coupled and/or connected to the computing device.

Figure 3B:
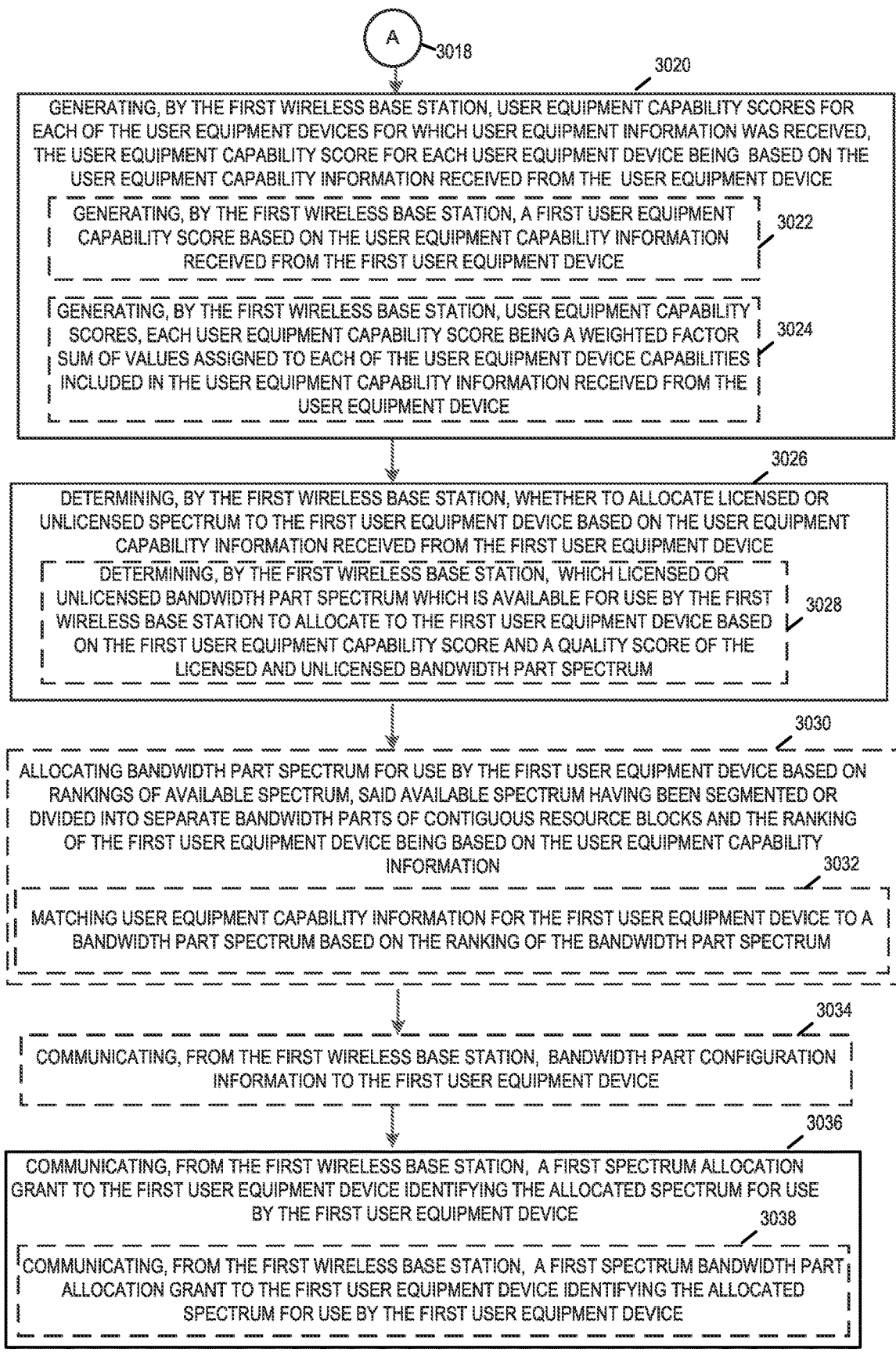
FIG. 3B illustrates the steps of the second part of an exemplary method in accordance with one embodiment of the present invention.

FIG. 3, which comprises the combination of FIGS. 3A and 3B illustrates an exemplary method 3000. FIG. 3A illustrates the steps of the first part of an exemplary method 3000 in accordance with one embodiment of the present invention. FIG. 3B illustrates the steps of the second part of an exemplary method 3000 in accordance with one embodiment of the present invention.

For explanatory purposes the exemplary method 3000 will be explained in connection with the exemplary wireless network system 100 illustrated in FIG. 1 wherein the wireless network is a 5G CBRS network, wireless base stations are CBSD devices, and the resource allocation management devices are SAS devices. The wireless base stations and user equipment devices of the 5G CBRS network support the 5G bandwidth part features. However, it should be understood that the method may be implemented using other systems (e.g., 5G systems) and other system configurations then those illustrated in FIG. 1. While it will be readily understood that additional steps and signaling are performed in connection with communicating information, messages, and packets between devices, the method 3000 focuses on and discusses the steps and signaling for understanding the invention.

The method 3000 starts in start step 3002 shown on FIG. 3A. Operation proceeds from start step 3002 to step 3004.

In step 3004, first spectrum availability information is received at a first wireless base station (e.g., system 100 wireless base station 102). The first spectrum availability information identifies the spectrum or bandwidth available for use by the first wireless base station. In some embodiments, the spectrum availability information is provided to first wireless base station from a policy control function device located in a core network (e.g., 5G core network (system 100 core network 150). The policy control function device having stored information on the spectrum (both licensed (PAL) and unlicensed spectrum (GAA)) available for use by the first wireless base station.

In some embodiments, at least some of the spectrum availability information (e.g., GAA spectrum availability information) is received by the first wireless base station from a resource allocation management device (e.g., system 100 SAS 1 106) via the policy control function device (system 100 PCF device 154) and/or a session management function device (system 100 SMF device 152) located in a 5G core network (system 100 1st service provider core network 150). The first wireless base station being coupled to the 5G core network and being part of the 5G network in which the PCF device and SMF device are located. Operation proceeds from step 2004 to step 3006.

In step 3006, spectrum interference information for the spectrum available for use by the first wireless base station is received at the first wireless base station. In some embodiments, this information is received from the session management function device (e.g., SMF device 152) which in turn received it from the policy control function device (e.g., PCF device 154 of system 100) which in turn received the information from the resource allocation management device (e.g., SAS 1 106 of system 100). In some embodiments, the spectrum interference information is provided to the first wireless base station along with first spectrum availability information. Operation proceeds from step 3006 to step 3008.

In step 3008, the first wireless base station, partitions, segments and/or divides the spectrum identified in the first spectrum available information as being available for use by the first wireless base station into a plurality of bandwidth parts. The plurality of bandwidth parts including at least one bandwidth part of licensed spectrum (e.g., PAL spectrum) and at least one bandwidth part of unlicensed spectrum (e.g., GAA spectrum). In some embodiments, the available spectrum is partitioned, segmented and/or divided into bandwidth parts at the 5G core network in addition to or in place of at the first wireless base station, e.g., by the policy control function device. In instances where the available spectrum for the first wireless base station is partitioned, segmented and/or divided into bandwidth parts in the 5G core network, e.g., by the PCF device, the first spectrum available information includes the bandwidth parts which are available for use by the first wireless base station. Each of said spectrum bandwidth parts identifies a contiguous set of resource blocks. In some embodiments, the first spectrum availability information includes the identification of spectrum bandwidth parts available for use by the first wireless base station with each of the spectrum bandwidth parts identifying a contiguous set of resource blocks. In some such embodiments, the first spectrum availability information includes both a licensed spectrum bandwidth part and an unlicensed spectrum bandwidth part. Operation proceeds from step 3008 to step 3010.

In step 3010, the first wireless base generates a quality score of the licensed and unlicensed spectrum bandwidth parts based on one or more of the following: a bandwidth part's spectrum type, number of user equipment devices allocated to the bandwidth part by the first wireless base station, and spectrum interference information for the bandwidth part spectrum. In some embodiments, step 3010 includes sub-step 3012. In sub-step 3012, the first wireless base station in generating the quality score for the licensed and unlicensed spectrum bandwidth parts also bases the quality score on the number of times that a spectrum bandwidth part has been granted to a base station for use in a geographical area in which the first wireless base station is operating. In some embodiments, the quality score is further based on the amount of bandwidth or spectrum included in the bandwidth part. Operation proceeds from step 3010 to step 3014.

In step 3014, user equipment capability information from user equipment devices are received at the first wireless base station. Step 3014 includes sub-step 3016. In sub-step 3016, user equipment capability information is received from a first user equipment device at the first wireless base station. Operation proceeds from step 3014 via connection node 3018 to step 3020 shown on FIG. 3B.

In step 3020, the first wireless base station generates, user equipment capability scores for each of the user equipment devices for which user equipment information was received. The user equipment capability score for each user equipment device being based on the user equipment capability information received from the user equipment device. In some embodiments step 3020 includes one or more sub-step 3022 and 3024. In sub-step 3022, the first wireless base station generates a first user equipment capability score based on user equipment capability information received from the first user equipment device. In sub-step 3024, the first wireless base station generates user equipment capability scores, each user equipment capability score being a weighted factor sum of values assigned to each of the use equipment device capabilities included in the user equipment capability information received from the user equipment device. Operation proceeds from step 3020 to step 3026.

In step 3026, the first wireless base station determines whether to allocate licensed or unlicensed spectrum to the first user equipment device based on the user equipment capability information received from the first user equipment device. In some embodiments, step 3026 includes sub-step 3028. In sub-step 3028, the first wireless base station determines which licensed or unlicensed bandwidth part spectrum which is available for use by the first wireless base station to allocate to the first user equipment device based on the first user equipment capability score and a quality score of the licensed and unlicensed bandwidth part spectrum. Operation proceeds from step 3028 to step 3030. Steps 3030 and 3034 are optional. If steps 3030 and 3034 are not implemented operation proceeds from step 3028 to step 3036.

In step 3030, the first wireless base station allocates bandwidth part spectrum for use by the first user equipment device based on rankings of available spectrum and the ranking of the first user equipment device. The ranking of the first user equipment device being based on the user equipment capability information. The available spectrum having been segmented, divided and/or partitioned into separate bandwidth parts of contiguous resource blocks. Step 3030 includes in some embodiments sub-step 3032. In sub-step 3032, the first wireless base station matches user equipment capability information for the first user equipment device to a bandwidth part spectrum based on the ranking of the bandwidth part spectrum. In some embodiments, the ranking of the bandwidth part spectrum is based on the quality score or the quality score is used for the ranking. In some embodiments, the ranking of the bandwidth part spectrum is based on one or more of the following: spectrum type of bandwidth, amount of spectrum included in the bandwidth part, number of user equipment devices to which the bandwidth part has been allocated by the wireless base station and/or the spectrum interference information for the bandwidth part. In some embodiments, the spectrum type is priority access license bandwidth type and general authorized access bandwidth type. In some such embodiments, the priority access license bandwidth type is ranked higher than general authorized access bandwidth type. In some embodiments, the spectrum type is licensed and unlicensed. In some such embodiments, the licensed bandwidth type is ranked higher than the unlicensed bandwidth type. In some embodiments, ranking the bandwidth parts of the spectrum available for use by the first wireless base includes normalizing different spectrum when bandwidth parts of different sizes (e.g., 10 MHz PAL spectrum vs. 20 MHz GAA spectrum) are available for use. In some embodiments, the quality score for available spectrum bandwidth parts is generated using a sum weighted average wherein the different factors are weighted and then summed. The weights representing the importance of the factor. In some embodiments, the ranking of bandwidth spectrum is determined using a sum weighted average wherein the different factors are weighted and then summed. The weights representing the importance of the factor. Operation proceeds from step 3030 to step 3034.

In step 3034, the first wireless base station communicates bandwidth part configuration information to the first user equipment device. The bandwidth part configuration information in various embodiments is communicated in the downlink control information sent to the wireless base station in Physical Downlink Control Channel. The bandwidth part configuration information provides the first user equipment device information to configure the first user equipment to be communicate with the first wireless base station using bandwidth parts. Operation proceeds from step 3034 to step 3036.

In step 3036, the first wireless base station communicates the first spectrum allocation grant to the first user equipment device identifying the allocated spectrum for use by the first user equipment device. In some embodiments, step 3036 includes sub-step 3038. In sub-step 3038, the first wireless base station communicates a first spectrum bandwidth part allocation grant to the first user equipment device identifying the allocated spectrum for use by the first user equipment device. In some embodiments, the bandwidth part configuration information is sent with or as part of the first spectrum bandwidth part allocation grant. The first spectrum bandwidth part allocation grant is communicated to the first user equipment device in the downlink control channel information sent to the first user equipment device in the Physical Downlink Control Channel.

The method is repeated as spectrum availability changes and/or additional user equipment devices are assigned/allocated spectrum (e.g., licensed bandwidth part spectrum or unlicensed bandwidth part spectrum) by the first wireless base station.

Various additional optional features and/or embodiments of method 3000 will now be discussed.

In some embodiments, the first wireless base station is a Citizens Broadband Radio Service Device (CBSD) which is part of a Citizens Broadband Radio Service (CBRS) network being operated by a first service provider/operator. In some of such embodiments, the licensed spectrum is Priority Access License (PAL) spectrum licensed tot eh first service provider and the unlicensed spectrum is General Authorized Access (GAA) spectrum granted for use by a Spectrum Access System of the CBRS network with which the first wireless base station is registered.

In various embodiments, the user equipment capability information includes one or more of the following: user equipment device type, user equipment device power requirement, dominant traffic type consumed (e.g., uplink traffic type, downlink traffic type) by the user equipment device, user equipment hardware capability, user equipment software capability, user equipment throughput capability, and user equipment device latency requirement. In some embodiments, the user equipment capability information includes a user equipment device category from which one or more user equipment capabilities can be derived. The derived user equipment capabilities includes one or more of the following: (i) user equipment device type, (ii) user equipment device power requirements, (iii) user equipment device hardware capability, (iv) user equipment device software capabilities, (v) dominant traffic type consumed by the user equipment device, (vi) throughput capability of the user equipment device, (vii) latency requirements of the user equipment device.

In some embodiments, the user equipment device type includes one or more of the following: (i) mobile phone type, (ii) appliance type (e.g., smart home device—thermostat, refrigerator, washer, dryer, television, security system), vehicle, laptop, tablet, smartphone, and computer.

In some embodiments, the user equipment device power requirements include a high power requirement, a mid-power power requirement, and a low power requirement. The low power requirement is a power requirement below a first threshold. The high power requirement is a power requirement above a second threshold. The a mid-power requirement is a power requirement equal to or greater than the first threshold and less than or equal to the second threshold.

In some embodiments, the user equipment device hardware capability includes one or more of the following capabilities: (i) single CPU hardware device, (ii) multi-core CPU hardware device, (iii) single Digital Signal Processing device, (iv) multi-core Digital Signal Processing device, (v) single Graphics Processing Unit device, and (vi) multi-core Graphics Processing Unit device, (vii) device hardware release or version.

In some embodiments, the user equipment software capability includes one or more of the following: software release or version, type of operating system (e.g., iOS, android, release and/or version of device's operating system.

In some embodiments, user equipment throughput capability includes: high throughput demand, mid-throughput demand, and low throughput demand. The low throughput demand is a throughput demand below a first throughput threshold. The high throughput demand is a throughput demand above a second throughput threshold. The mid-throughput demand is a throughput demand equal to or greater than the first throughput threshold and less than or equal to the second throughput threshold.

In some embodiments, the user equipment latency requirement capability includes a set of latency requirements defined by a set of thresholds which categorize very strict latency requirement devices, strict latency requirement devices, normal latency requirement devices, low latency requirement devices.

In various embodiments, the user equipment capability score for a user equipment device is generated using a weighted factor sum of values assigned to each of the first user equipment device capabilities included in the user equipment capability information provided to the wireless base station generating the user equipment capability score. The weights representing the importance of the factor. For example, in some embodiments, the first user equipment device capability score is generated based on the user equipment capability information received from the first user equipment device by performing the following summation: W1 user equipment capability 1+W2 user equipment capability 2+W3 user equipment capability 3+W4 user equipment capability 4; wherein user equipment capability 1 is a numerical value assigned to the first user equipment capability included in the user equipment capability information received from the first user equipment device and wherein W1 is a numerical value weighting factor assigned for the first user equipment capability; wherein user equipment capability 2 is a numerical value assigned to the second user equipment capability included in the user equipment capability information received from the first user equipment device and wherein W2 is a numerical value weighting factor assigned for the second user equipment capability; wherein user equipment capability 3 is a numerical value assigned to the third user equipment capability included in the user equipment capability information received from the first user equipment device and wherein W3 is a numerical value weighting factor assigned for the third user equipment capability; wherein user equipment capability 4 is a numerical value assigned to the fourth user equipment capability included in the user equipment capability information received from the first user equipment device and wherein W4 is a numerical value weighting factor assigned for the fourth user equipment capability; and the user equipment capability information includes at least four user equipment device capabilities. In some embodiments, the wireless base station ranks the user equipment devices using the generated user equipment capability scores and based on the ranking matches the user equipment device to a spectrum bandwidth part. For example, if there are four bandwidth parts and 40 user equipment devices, the wireless base station may rank the 40 user equipment devices by user equipment capability score highest to lowest with 40 being highest and 1 being lowest. The 40 user equipment devices may then be grouped into four groups based on the user equipment devices score or ranking. Each of the four groups corresponding to one of the bandwidth parts. For example, user equipment group 1 with the highest ranking user equipment capability devices will have bandwidth part 1 spectrum allocated to it. Bandwidth part 1 spectrum also having the highest ranking indicating it has the best quality, e.g., lowest interference and lowest number of user equipment devices assigned. User equipment group 2 with the second highest ranking user equipment capability devices will have bandwidth part 2 spectrum allocated it. Bandwidth part 2 spectrum being the second highest ranked bandwidth part spectrum. User equipment group 3 with the third highest ranking user equipment capability devices will have bandwidth part 3 spectrum allocated it. Bandwidth part 4 spectrum being the fourth highest ranked bandwidth part spectrum or in this case the lowest ranked bandwidth part spectrum. User equipment group 4 with the fourth highest ranking user equipment capability devices or in this case the lowest ranked used equipment capability devices will have bandwidth part 4 spectrum allocated it. Bandwidth part 4 spectrum being the lowest ranked bandwidth part spectrum of the four bandwidth parts available for use by the wireless base station.

Figure 10A:
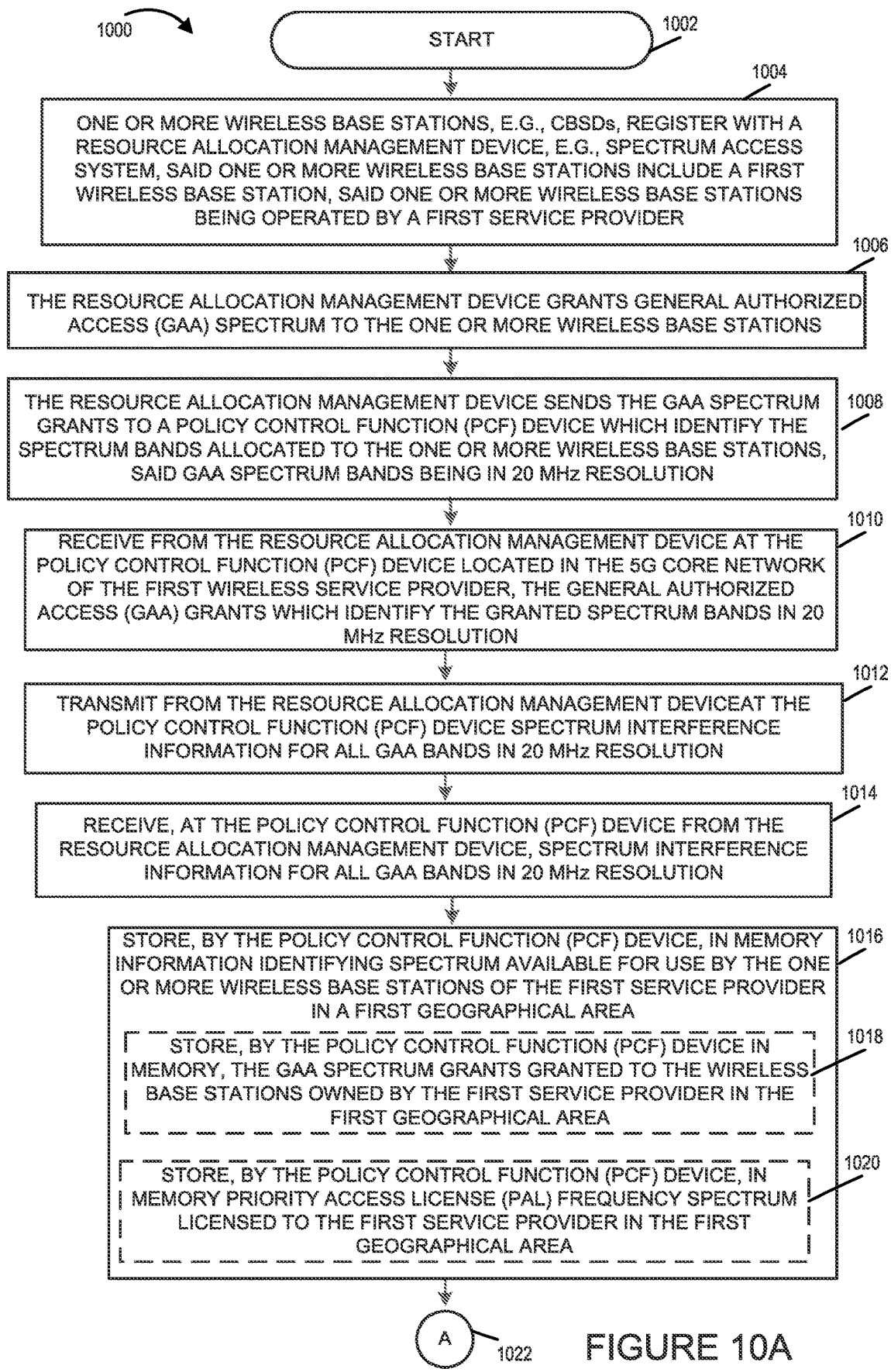
FIG. 10A illustrates the steps of the first part of an exemplary method in accordance with one embodiment of the present invention.
Figure 10B:
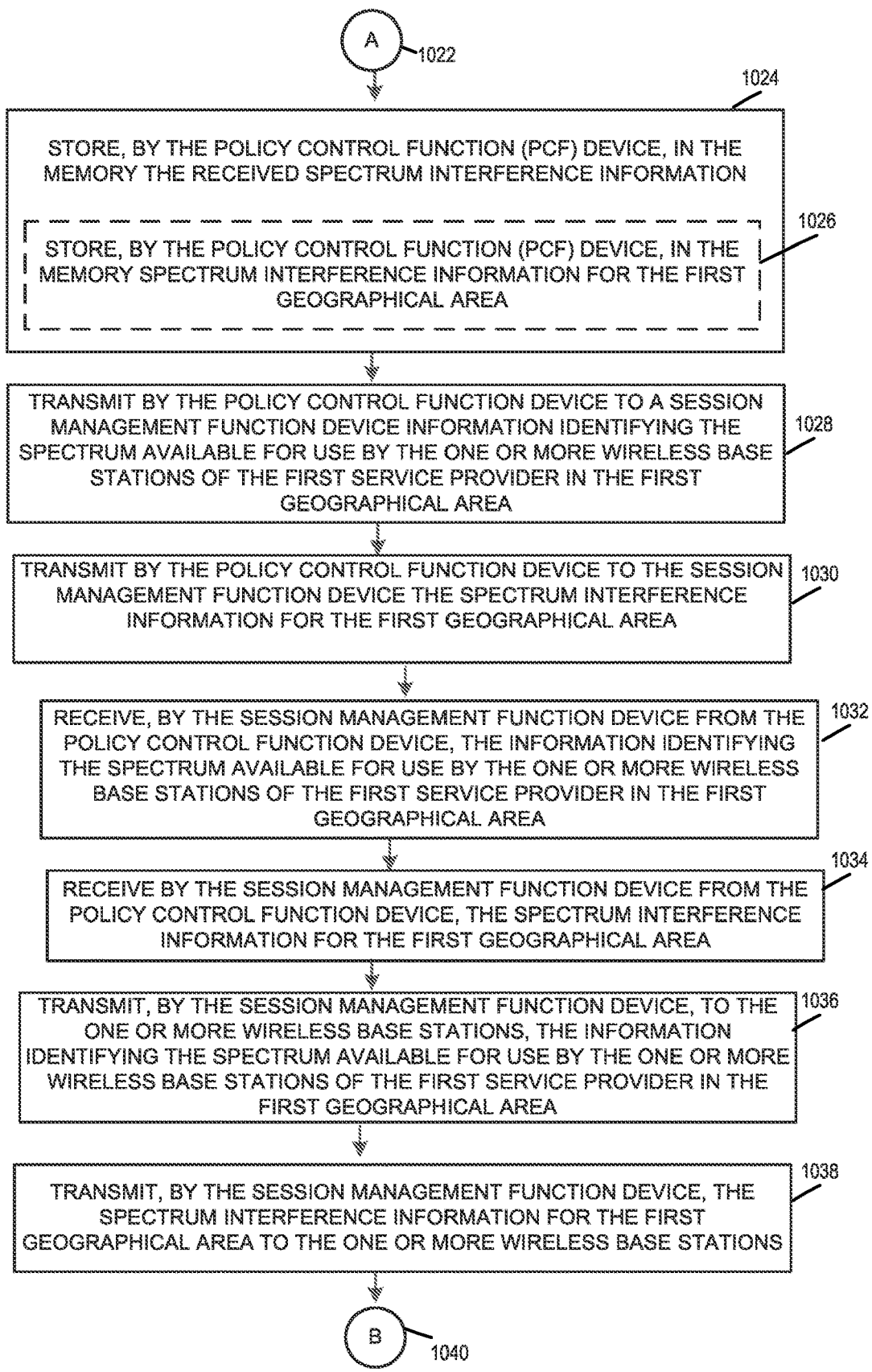
FIG. 10B illustrates the steps of the second part of an exemplary method in accordance with one embodiment of the present invention.
Figure 10C:
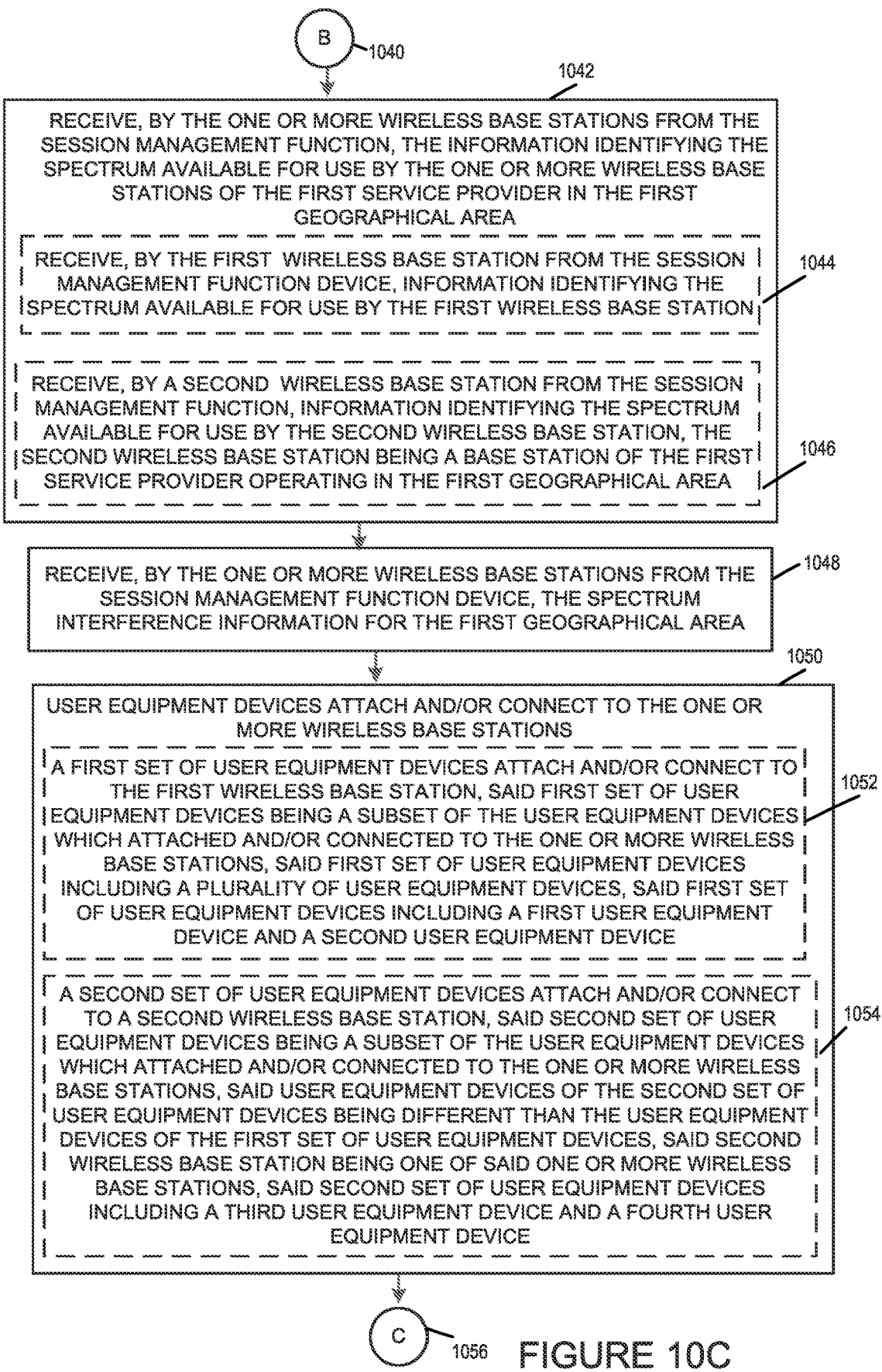
FIG. 10C illustrates the steps of the third part of an exemplary method in accordance with one embodiment of the present invention.
Figure 10D:
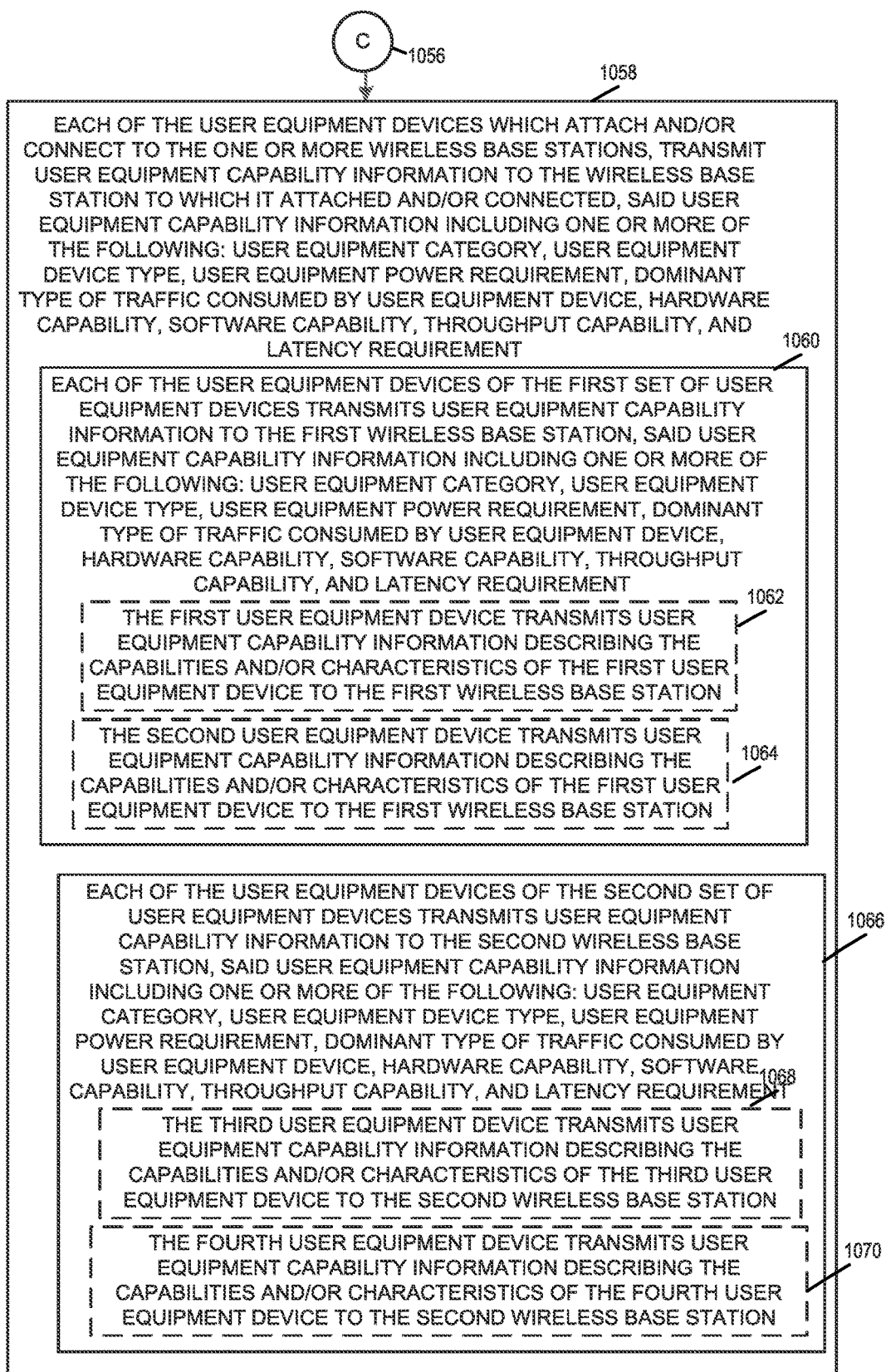
FIG. 10D illustrates the steps of the fourth part of an exemplary method in accordance with one embodiment of the present invention.
Figure 10E:
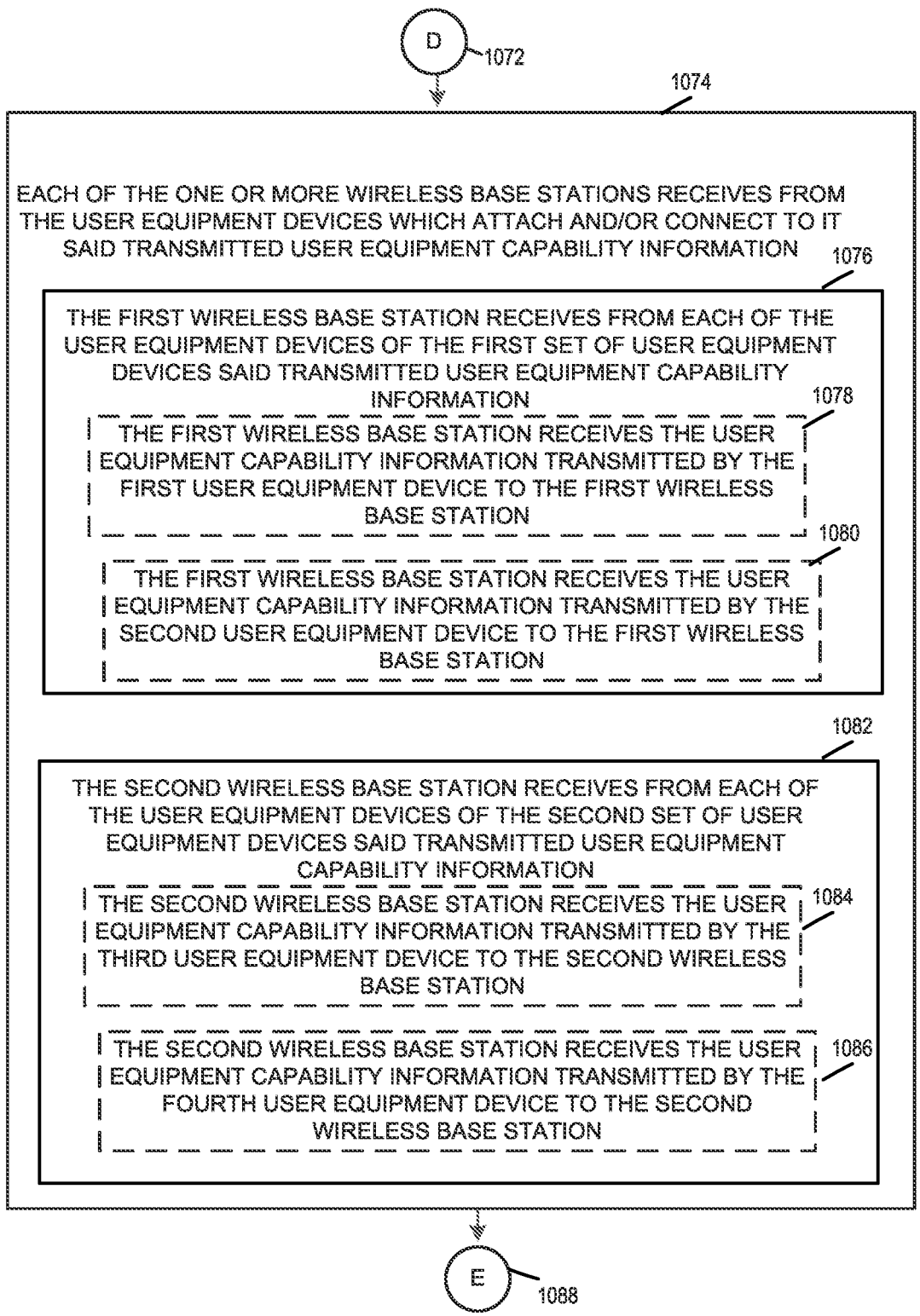
FIG. 10E illustrates the steps of the fifth part of an exemplary method in accordance with one embodiment of the present invention.
Figure 10F:
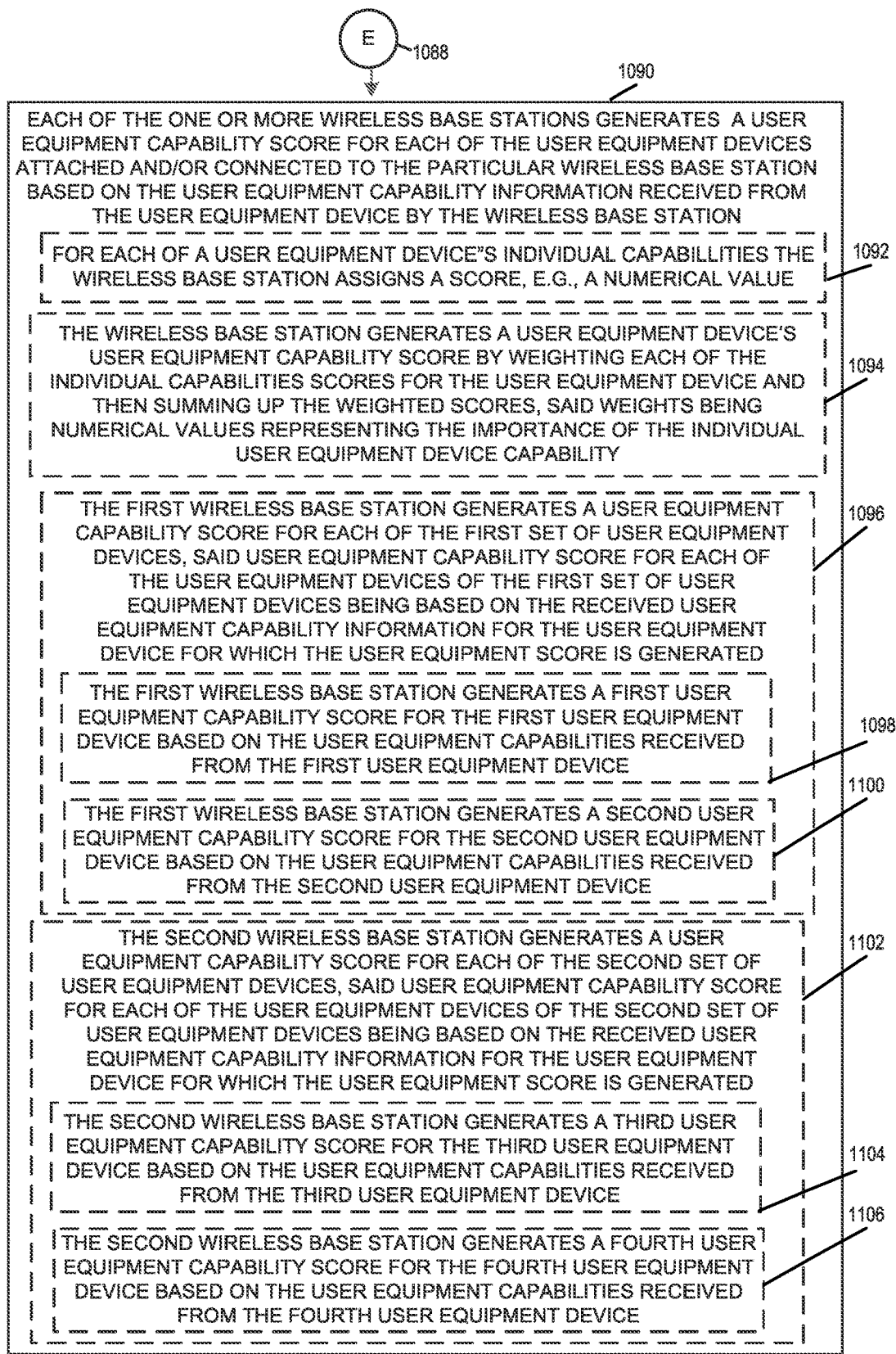
FIG. 10F illustrates the steps of the sixth part of an exemplary method in accordance with one embodiment of the present invention.
Figure 10G:
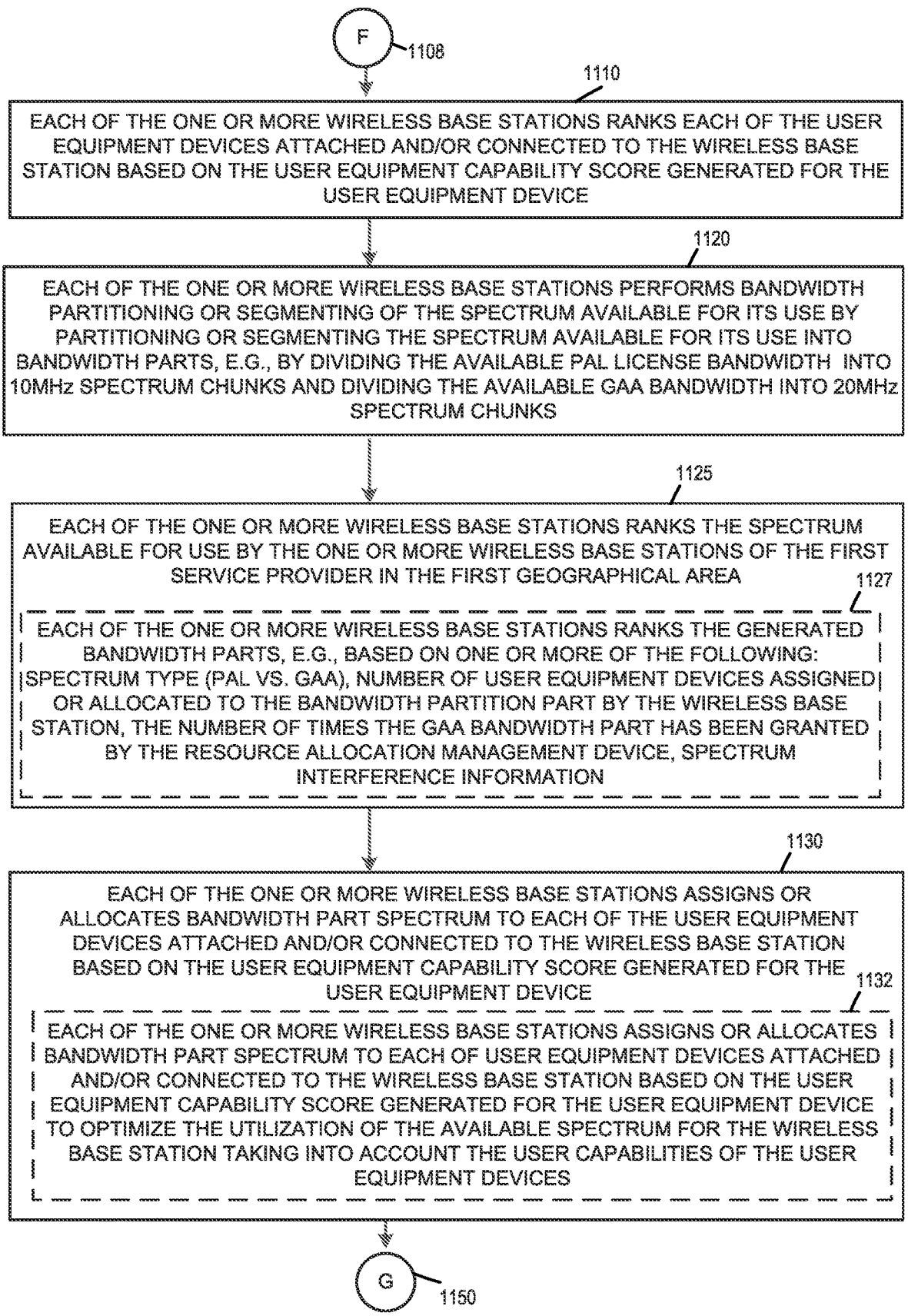
FIG. 10G illustrates the steps of the seventh part of an exemplary method in accordance with one embodiment of the present invention.
Figures 10, 10A, 10B, 10C, 10D, 10E, 10F, 10G, 10H:
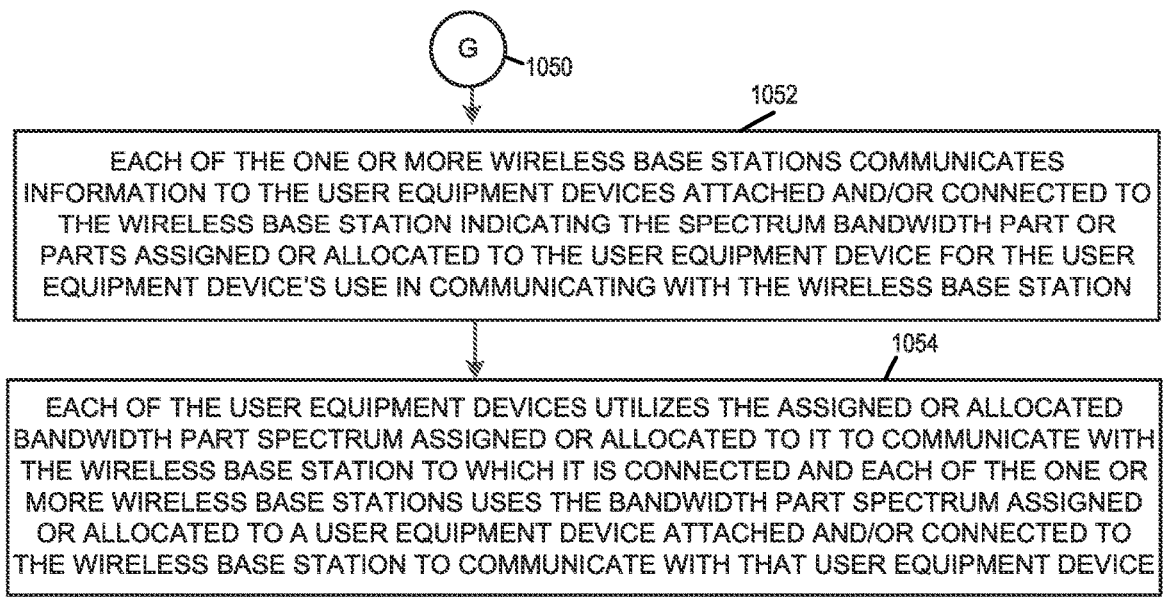
FIG. 10 illustrates the combination of FIGS. 10A, 10B, 10C, 10D, 10E, 10F, 10G, and 10H.
FIG. 10H illustrates the steps of the eighth part of an exemplary method in accordance with one embodiment of the present invention.

FIG. 10 which illustrates the steps of a flowchart of a method 1000 illustrates another exemplary method embodiment for managing bandwidth spectrum in a wireless communications system in accordance with the present invention.

FIG. 10 illustrates the combination of FIGS. 10A, 10B, 10C, 10D, 10E, 10F, 10G, and 10H. FIG. 10A illustrates the steps of the first part of an exemplary method in accordance with one embodiment of the present invention. FIG. 10B illustrates the steps of the second part of an exemplary method in accordance with one embodiment of the present invention. FIG. 10C illustrates the steps of the third part of an exemplary method in accordance with one embodiment of the present invention. FIG. 10D illustrates the steps of the fourth part of an exemplary method in accordance with one embodiment of the present invention. FIG. 10E illustrates the steps of the fifth part of an exemplary method in accordance with one embodiment of the present invention. FIG. 10F illustrates the steps of the sixth part of an exemplary method in accordance with one embodiment of the present invention. FIG. 10G illustrates the steps of the seventh part of an exemplary method in accordance with one embodiment of the present invention. FIG. 10H illustrates the steps of the eighth part of an exemplary method in accordance with one embodiment of the present invention.

For explanatory purposes the exemplary method 1000 will be explained in connection with the exemplary communications system 100 illustrated in FIG. 1 wherein the wireless network is a 5G CBRS network, wireless base stations are CBSD devices, the resource allocation management devices are SAS devices, and the user equipment devices are mobile terminals. The devices of the communications system, e.g., wireless base stations and user equipment device support the feature of bandwidth parts, e.g., 5G New Radio bandwidth parts. However, it should be understand that the method may be implemented using other systems that support the bandwidth parts features, e.g., other non-CBRS 5G wireless systems as well as other system configurations then those illustrated in FIG. 1. While it will be readily understood that additional steps and signaling are performed in connection with communicating information, messages, and packets between devices, the method 1000 focuses on and discusses the steps and signaling for understanding the invention.

The method 1000 shown in FIG. 10 will now be discussed in detail. The method starts in start step 1002 shown on FIG. 10A with the devices in communications system 100 being initialized and becoming operational.

Operation proceeds from start step 1002 to step 1004. In step 1004, one or more wireless base stations, e.g., CBSDs, register with a resource allocation management device, e.g., a spectrum access system. The one or more wireless base stations include a first wireless base station, e.g., CBSD 1 102 of system 100. The one or more wireless base stations are also operated by a first service provider. The first service provider is sometimes referred to as a wireless system operator. The one or more wireless base stations are typically also owned by the first service provider. In system 100 the wireless base station 104, e.g., CBSD 2 is also owned by the first service provider and may be, and in some embodiments is, one of the one or more wireless base stations. Operation proceeds from step 1004 to step 1006.

In step 1006, the resource allocation management device grants general authorized access (GAA) spectrum to the one or more wireless base stations. In various embodiments, the GAA spectrum grants for the one or more wireless base stations of the first service provider are to be shared and/or utilized by all wireless base stations operated by the first service provider in a first geographical area or location such as a county or city. The one or more wireless base stations being located within the first geographical area or location. Operation proceeds from step 1006 to step 1008.

In step 1008, the resource allocation management device sends the GAA spectrum grants to a policy control function (PCF) device. The GAA spectrum grants identify the spectrum bands allocated to the one or more wireless base stations. The GAA spectrum bands of the GAA grants are in 20 MHz resolution. Operation proceeds from step 1008 to step 1010.

In step 1010, the policy control function device receives from the resource allocation management device the GAA spectrum grants which identify the granted spectrum bands in 20 MHz resolutions. The policy control function device is located in the 5G core network of the first wireless service provider. Operation proceeds from step 1010 to step 1012.

In step 1012, the resource allocation management device determines the spectrum interference for the spectrum in the CBRS system and transmits to the policy control function device spectrum interference information for all GAA bands in 20 MHz resolution. The spectrum interference information also includes both adjacent channel interference and co-channel interference information. Operation proceeds from step 1012 to step 1014.

In step 1014, the policy control function device receives from the resource allocation management device the transmitted spectrum interference information for all GAA bands in 20 MHz resolution. Operation proceeds from step 1014 to step 1016.

In step 1016, the policy control function device stores in memory or in storage device attached to the policy control function device information identifying the spectrum available for use by the one or more wireless base stations of the first service provider in the first geographical area. The first geographical area being the geographical area wherein the one or more wireless base stations are located. In some embodiments, the step 1016 includes one or more sub-steps 1018 and 1020. In sub-step 1018, the policy control function device stores in memory the GAA spectrum grants granted to the wireless base stations owned by the first service provider in the first geographical area. In sub-step 1020, the policy control function device stores in memory the Priority Access License (PAL) frequency spectrum licensed to the first service provider in the first geographical area. Operation proceeds from step 1016 to step 1024 shown on FIG. 10B via connection node A 1022.

In step 1024, the policy control function device stores in memory or a storage device connected to the policy control function device the received spectrum interference information. The spectrum interference information includes spectrum interference information for the first geographical area. In some embodiments, step 1024 includes sub-step 1026. In sub-step 1026, the policy control function device stores in memory spectrum interference information for the first geographical area along with information identifying the geographical area, spectrum available for use by the first service provider in the first geographical area and the wireless base stations being operated by the first service provider in the first geographical area. Operation proceeds from step 1024 to step 1028.

In step 1028, the policy control function device transmits to a session management function device information identifying the spectrum available for use by the one or more wireless base stations of the first service provider operating in the first geographical area. Operation proceeds from step 1028 to step 1030.

In step 1030, the policy control function device transmits to the session management function device the spectrum interference information for the first geographical area. Operation proceeds from step 1030 to step 1032.

In step 1032, the session management function device receives from the policy control function device the information identifying the spectrum available for use by the one or more wireless base stations of the first service provider in the first geographical area. Operation proceeds from step 1032 to step 1034.

In step 1034, the session management function device receives from the policy control function device3 the spectrum interference information for the first geographical area. Operation proceeds from step 1034 to step 1036.

In step 1036, the session management function device transmits to the one or more wireless base stations the information identifying the spectrum available for use by the one or more wireless base stations of the first service provider in the first geographical area. Operation proceeds from step 1036 to step 1038.

In step 1038, the session management function device transmits the spectrum interference information for the first geographical area to the one or more wireless base stations. Operation proceeds from step 1038 via connection node B 1040 to step 1042 shown on FIG. 10C.

In step 1042, the one or more wireless base stations receive from the session management function device the information identifying the spectrum available for use by the one or more wireless base stations of the first service provider in the first geographical area. In some embodiments, step 1042 includes one or more sub-step 1044 and 1046. In sub-step 1044, the first wireless base station receives from the session management function device information identifying the spectrum available for use by the first wireless base station in the first geographical area. In sub-step 1046, the second wireless base station receives from the session management function device information identifying the spectrum available for the use by the second wireless base station in the first geographical area. The second wireless base station being a wireless base station of the first service provider operating in the first geographical area. In various embodiments, the spectrum available for use by the one or more wireless base station includes GAA spectrum granted by the resource allocation management device and PAL spectrum licensed by the first service provider. The spectrum available for use by the first wireless base station includes both GAA spectrum and PAL spectrum. The spectrum available for use by the second wireless base station includes both GAA spectrum and PAL spectrum. In some embodiments, such as for example those wherein the first and second wireless base stations do not have overlapping coverage areas, the first and second wireless base stations may have the same or overlapping spectrum allocated for use. Operation proceeds from step 1042 to step 1048.

In step 1048, the one or more wireless base stations receive from the session management function device the spectrum interference information for the first geographical area. Operation proceeds from step 1048 to step 1050.

In step 1050, user equipment devices attach and/or connect to the one or more wireless base stations. For example, with respect to system 100 UE 1 110, UE 2 112, . . . , UE N 114 connect to the wireless base station 102 and UE 6 120, UE 7 122, UE 8 124, . . . , UE X 126 connect to the wireless base station 104. In some embodiments, the step 1050 includes one or more sub-steps 1052 and 1054.

In sub-step 1052, a first set of user equipment devices attach and/or connect to the first wireless base station. The first set of user equipment devices being a subset of user equipment devices which attached and/or connected to the one or more wireless base stations. The first set of user equipment devices including a plurality of user equipment devices. The first set of user equipment devise including a first user equipment device and a second user equipment device. With respect to system 100, the first set of user equipment devices includes UE 1 110, UE 2 112, . . . , UE N 114.

In sub-step 1054, a second set of user equipment devices attach and/or connect to the second wireless base station. The second set of user equipment devices being a subset of user equipment devices which attached and/or connected to the one or more wireless base stations. The second set of user equipment devices including a plurality of user equipment devices. The user equipment devices of the first set of user equipment devices and the second set of user equipment devices being different. The second set of user equipment devise including a third user equipment device and a fourth user equipment device. With respect to system 100, the second set of user equipment devices includes UE 6 120, UE 7 122, UE 8 124, . . . , UE X 126.

Operation proceeds from step 1050 via connection node C 1056 to step 1058 shown on FIG. 10D. In step 1058, each of the user equipment devices which attach and/or connect to the one or more wireless base stations, transmit user equipment capability information to the wireless base station to which it attached and/or connected. The user equipment capability information includes one or more of the following: user equipment category, user equipment device type, user equipment power requirement, dominant type of traffic consumed by the user equipment device, hardware capability, software capability, throughput capability, and latency requirement. The user equipment capability information describes one or more capabilities of the user equipment device. In some embodiments, the user equipment device send its user equipment capability information to the wireless base station to which it has attached or connected during the connection process. In some embodiments, the user equipment device sends its user equipment capability information to the wireless base station in response to a request for user equipment capability information from the wireless base station. The user equipment category information in some embodiments defines the category that the user equipment device belongs to. The wireless base station then derives the user equipment capabilities of the user equipment device from the user equipment category reported or sent to the wireless base station from the user equipment device. In some embodiments step 1058 includes one or more sub-steps 1060 and 1066.

In sub-step 1060, each of the user equipment devices of the first set of user equipment devices transmits user equipment capability information to the first wireless base station. The user equipment capability information includes one or more of the following: user equipment category, user equipment device type, user equipment power requirement, dominant type of traffic consumed by the user equipment device, hardware capability, software capability, throughput capability, and latency requirement. In some embodiments sub-step 1060 includes one or more sub-steps 1062 and 1064.

In sub-step 1062, the first user equipment device transmits user equipment capability information describing the capabilities and/or characteristics of the first user equipment device to the first wireless base station. In sub-step 1064, the second user equipment device transmits user equipment capability information describing the capabilities and/or characteristics of the first user equipment device to the first wireless base station.

In sub-step 1066, each of the user equipment devices of the second set of user equipment devices transmits user equipment capability information to the second wireless base station. The user equipment capability information includes one or more of the following: user equipment category, user equipment device type, user equipment power requirement, dominant type of traffic consumed by the user equipment device, hardware capability, software capability, throughput capability, and latency requirement. In some embodiments sub-step 1066 includes one or more sub-steps 1068 and 1070.

In sub-step 1068, the third user equipment device transmits user equipment capability information describing the capabilities and/or characteristics of the third user equipment device to the second wireless base station. In sub-step 1070, the fourth user equipment device transmits user equipment capability information describing the capabilities and/or characteristics of the fourth user equipment device to the second wireless base station.

Operation proceeds from step 1058 via connection node D 1072 to step 1074 shown on FIG. 10E. In step 1074, each of the one or more wireless base stations receives from the user equipment devices which attach and/or connect to it the transmitted user equipment capability information. In some embodiments, step 1074 includes one or more sub-steps 1076 and 1082.

In sub-step 1076, the first wireless base station receives from each of the user equipment devices of the first set of user equipment devices the transmitted user equipment capability information. Sub-step 1076 in some embodiments includes one or more sub-steps 1078 and 1080. In sub-step 1078, the first wireless base station receives the user equipment capability information transmitted by the first user equipment device to the first wireless base station. In sub-step 1080, the first wireless base station receives the user equipment capability information transmitted by the second user equipment device to the first wireless base station.

In sub-step 1082, the second wireless base station receives from each of the user equipment devices of the second set of user equipment devices the transmitted user equipment capability information. Sub-step 1082 in some embodiments includes one or more sub-steps 1084 and 1086. In sub-step 1084, the second wireless base station receives the user equipment capability information transmitted by the third user equipment device to the second wireless base station. In sub-step 1086, the second wireless base station receives the user equipment capability information transmitted by the fourth user equipment device to the second wireless base station.

Operation proceeds from step 1074 via connection node E 1088 to step 1090 shown on FIG. 10F. In step 1090, each of the one or more wireless base stations generates a user equipment capability score for each of the user equipment devices attached and/or connected to the particular wireless base station base station. The user equipment capability score for a user equipment device is generated based on the user equipment capability information received from the user equipment device by the wireless base station. In some embodiments, step 1090 includes one or more sub-steps 1092, 1094, 1096, and 1102.

In sub-step 1092, for each of a user equipment device's individual capabilities the wireless base station assigns a score, e.g., a numerical value.

In sub-step 1094, the wireless base station generates a user equipment device's user equipment capability score by weighting each of the individual capabilities scores for the user equipment device and then summing up the weighted scores. The weights are numerical values representing the importance of the individual user equipment device capability.

In sub-step 1096, the first wireless base station generates a user equipment capability score for each of the first set of user equipment devices. The user capability score fore ach of the user equipment devices of the first set of user equipment devices is generated based on the received user equipment capability information for the user equipment device for which the user equipment score is generated. In some embodiments, sub-step 1096 includes one or more sub-steps 1098 and 1100. In sub-step 1098, the first wireless base station generates a first user equipment capability score for the first user equipment device based on the user equipment capabilities received from the first user equipment device. In sub-step 1100, the first wireless base station generates a second user equipment capability score for the second user equipment device based on the user equipment capabilities received from the second user equipment device.

In sub-step 1102, the second wireless base station generates a user equipment capability score for each of the second set of user equipment devices. The user capability score fore ach of the user equipment devices of the second set of user equipment devices is generated based on the received user equipment capability information for the user equipment device for which the user equipment score is generated. In some embodiments, sub-step 1102 includes one or more sub-steps 1104 and 1106. In sub-step 1104, the second wireless base station generates a third user equipment capability score for the third user equipment device based on the user equipment capabilities received from the third user equipment device. In sub-step 1106, the second wireless base station generates a fourth user equipment capability score for the fourth user equipment device based on the user equipment capabilities received from the fourth user equipment device.

Operation proceeds from step 1106 via connection node F 1108 to step 1110 shown on FIG. 10G. In step 1110, each of the one or more wireless base stations ranks each of the user equipment devices attached and/or connected to the wireless base station based on the user equipment capability score generated for the user equipment device. Operation proceeds from step 1110 to step 1120.

In step 1120, each of the one or more wireless base stations performs bandwidth partitioning or segmenting of the spectrum available for its use by partitioning or segmenting the spectrum available for its use into bandwidth parts, e.g., by dividing the available PAL license bandwidth spectrum into 10 MHz spectrum chunks and dividing the available GAA bandwidth spectrum into 20 MHz spectrum chunks. Operation proceeds from step 1120 to step 1125.

In step 1125, each of the one or more wireless base stations ranks the spectrum available for use by the one or more wireless base stations of the first service provider in the first geographical area. Step 1125 in some embodiments includes sub-step 1127. In sub-step 117, each of the one or more wireless base stations ranks the generated bandwidth parts, e.g., based on one or more of the following: spectrum type (PAL vs. GAA), number of user equipment devices assigned or allocated to the bandwidth part by the wireless base station, the number of times the GAA bandwidth part has been granted by the resource allocation management device, and spectrum interference information. PAL spectrum will have less interference than GAA spectrum and will be ranked higher than GAA spectrum. The PAL 10 MHZ spectrum chunks will be ranked by interference and number of user equipment devices to which it has been assigned or allocated. The most valuable PAL spectrum chunk which has the highest ranking is the one which has the lowest interference and has been assigned or allocated to the smallest number of user equipment devices. The GAA 20 MHz spectrum chunks may also be ranked based on interference and the number of times the GAA spectrum has been assigned or allocated. The GAA spectrum chunks which have been granted the lowest number of times receiving the highest ranking.

Operation proceeds from step 1125 to step 1130. In step 1130, each of the one or more wireless base stations assigns or allocates bandwidth part spectrum to each of the user equipment devices attached and/or connected to the wireless base station based on the user equipment capability score generated for the user equipment device. In some embodiments, step 1130 includes sub-step 1132. In sub-step 1132, each of the one or more wireless base stations assigns or allocates bandwidth part spectrum to each of the user equipment devices attached and/or connected to the wireless base station based on the user equipment capability score generated for the user equipment device to optimize the utilization of the available spectrum for the wireless base station taking into account the user capabilities of the user equipment devices.

Operation proceeds from step 1130 via connection node G 1150 to step 1152 shown on FIG. 10H. In step 1152, each of the one or more wireless base stations communicates information to the user equipment devices attached and/or connected to the wireless base station indicating the spectrum bandwidth part or parts assigned or allocated to the user equipment device for the user equipment device's use in communicating with wireless base station. Operation proceeds from step 1152 to step 1154.

In step 1154, each of the user equipment devices utilizes bandwidth part spectrum assigned and/or allocated to it by the wireless base station to which it is attached and/or connected to communicate with the wireless base station. The wireless base station similarly uses the bandwidth part spectrum assigned to a user equipment device attached and/or connected to the wireless base station to communicate with the user equipment device.

Various implementations and optional features of the method 1000 will now be discussed.

In some embodiments, the spectrum is scored and/or ranked based on spectrum type and the amount of spectrum in the spectrum bandwidth part. Spectrum type may be licensed (e.g., PAL spectrum type) or unlicensed (GAA spectrum type). Spectrum amount is minimum 10 MHz and increases at 10 MHz intervals. If the PAL spectrum bandwidth part is 10 MHz and the GAA spectrum band part is 20 MHZ, then the spectrum ratio for PAL will be 1 and the spectrum ratio for GAA will be 2. Each of the spectrum bandwidth parts is ranked and/or scored using the following weighting formula: W1*spectrum type+W2*spectrum amount ratio. W1 and W2 are weighting factors to make the spectrum value equal. The determine how important a particular type of bandwidth is in comparison to another type of bandwidth. The spectrum amount ratio defines what amount of a first type of bandwidth is equal to a second type of bandwidth. In this example, the spectrum ratio for GAA is 2 which means 2 times the amount of GAA bandwidth is the equivalent of PAL bandwidth, i.e., 20 MHz of GAA bandwidth is the equivalent of 10 MHz of PAL bandwidth.

As previously discussed, a user equipment device's features and/or capability information may be, and in many embodiments is, used to determine what bandwidth part spectrum to allocate to a user equipment device. For example, UE 1 has the following capabilities: high throughput demand (500 Mbps), low latency requirement (lower than 10 msec), latest iOs release of software, 2 CPUs and 1 GPU; UE 2 has the following capabilities: mid throughput demand (100 Mbps), low latency requirement (lower than 10 msec), the latest iOS release and 1 CPU. Based on this user capability information a wireless base station will determine that UE 1 has higher priority than UE 2. These features/capabilities will be used in a weighted sum formula to calculate the priority of the user equipment devices UE 1 and UE 2. An exemplary priority weighted sum formula is:

$$\text{Priority} = w1 * \text{throughput demand} + w2 * \text{latency} +$$
$$w3 * \text{software release} + w4(\text{number of } CPUs + \text{number of } GPUs) +$$
$$w5 * \text{power requirements} + w6 * \text{device model} + w7 * \text{device type}$$

w1, w2, w3, w4, w5, w6, w7 are the weighting factors. The capabilities which are not numerical values are assigned numerical values corresponding to their priority, e.g., newer model have higher priority.

The formula produces a number in the range [1,N] There will be different intervals in this [0,N] range depending on the service provider. For example, if a service provider wants to have 3 intervals then [0, N/3], [N/3+1, 2*N/3], [2*N/3,N]. Each interval results in one grouping. Overall the results is three groups of UEs with each group having a different priority level, i.e., three priority levels each priority level corresponding to a grouping into which a UE will be placed.

Figure 15:
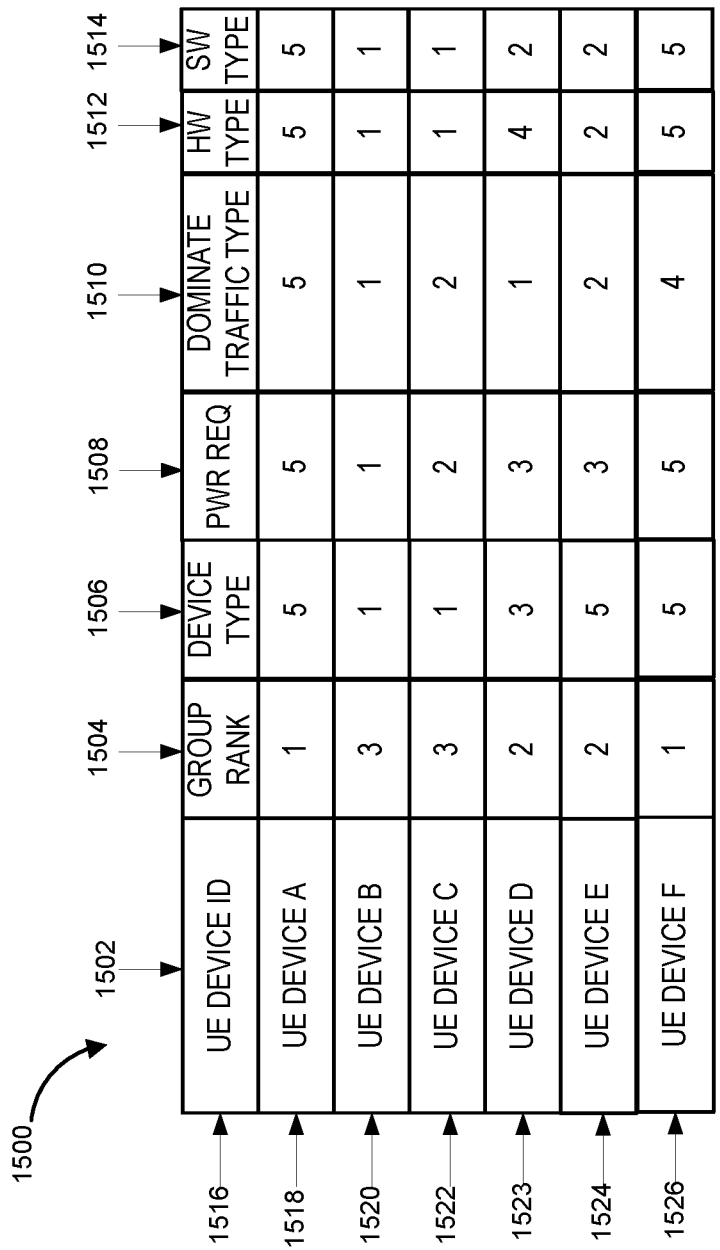
FIG. 15 is a table illustrating user equipment device group rankings based on user equipment capabilities in accordance with one embodiment of the present invention.

An example of how the assignments of bandwidth parts are made based on the spectrum rankings and/or scores and user equipment rankings and/or scores to obtain the optimum or best allocations of spectrum will now be discussed. Higher rank or scored spectrum is assigned or allocated to higher rank/score user equipment devices first. For example, if a wireless base station has three spectrum bandwidth parts:

Bandwidth part 1 40 MHz PAL spectrum 1st rank,
Bandwidth part 2 40 MHz GAA spectrum 2nd rank,
Bandwidth part 3 10 MHz PAL spectrum 3rd rank
and
UE group 1: 1st rank
UE group 2: 2nd rank
UE group 3: 3rd rank UE group 1 is served by bandwidth part 1 spectrum, UE group 2 is served by bandwidth part 2 spectrum and UE group 3 is served by bandwidth part 3 spectrum. In such instances where the number of spectrum bandwidth parts do not match with the number of UE groups various methods may be employed for allocation of the bandwidth parts to user groups. In such cases, the allocation of bandwidth parts will still be done by matching high ranked user groups and high ranked bandwidth parts with each other. That is matching the bandwidth part spectrum and user groups based on priority rankings. Diagram 1500 of FIG. 15 shows an example of six user equipment devices UE A, UE B, UE C, UE D, UE E and UE F which are grouped into three priority groups 1, 2, and 3 based on user equipment capabilities device type, power requirements dominant traffic type consumed, hardware equipment release and software release. The values for each of the user equipment capabilities has been normalized. The group rankings are group 1 highest priority, group 2 second highest priority and group 3 lowest priority.

Row 1516 of table 1500 illustrates labels identifying the information contained in each column and is not data. The entries in column 1502 of table 1500 include user equipment device identifiers for the UEs in communication with a wireless base station (e.g., a WBS 1, e.g., CBSD 1 102). The user equipment device identifiers can be any identifier that uniquely identifies the user equipment device. Exemplary user equipment device identifiers include International Mobile Subscriber Identity (IMSI) numbers and International Mobile Equipment Identity (IMEI) numbers. The entries in column 1504 of table 1500 include the wireless base station determined priority group rank for the UEs in communication with the wireless base station (e.g., CBSD) identified in the same row. The entries in column 1506 of table 1500 include device type information for the UEs in communication with the wireless base station (e.g., CBSD) identified in the same row. The entries in column 1508 of table 1500 include power requirement information for the UEs in communication with the wireless base station (e.g., CBSD) identified in the same row. The entries in column 1510 of table 1500 include dominant traffic type consumed information for the UEs in communication with the wireless base station (e.g., CBSD) identified in the same row. The entries in column 1512 of table 1500 include hardware type information for the UEs in communication with the wireless base station (e.g., CBSD) identified in the same row. The entries in column 1514 of table 1500 include software type information for the UEs in communication with the wireless base station (e.g., CBSD) identified in the same row. The entries in row 1518 include information corresponding to user equipment device A. The entries in row 1520 include information corresponding to user equipment device B. The entries in row 1522 include information corresponding to user equipment device C. The entries in row 1523 include information corresponding to user equipment device D. The entries in row 1524 include information corresponding to user equipment device E. The entries in row 1526 include information corresponding to user equipment device F. The device type, power requirements, dominate traffic type, hardware type and software type values included in table 1500 are numerical weighted values generated based on the user equipment capability. For example, a device type of smartphone may be assigned a weighted value of 5 while a device type of sensor device may be assigned a value of 1. The weighted values take into account the importance of the feature.

Various exemplary numbered embodiments illustrating different features of the present invention will now be discussed.

List of Exemplary Numbered Method Embodiments

Method Embodiment 1. A communications method comprising: receiving user equipment capability information at a first wireless base station from a first user equipment device; determining, by the first wireless base station, whether to allocate licensed or unlicensed spectrum to the first user equipment device based on the received user equipment capability information; and communicating a first spectrum allocation grant to the first user equipment device identifying the allocated spectrum for use by the first user equipment device.

Method Embodiment 2. The communications method of Method Embodiment 1 further comprising: prior to determining whether to allocate licensed or unlicensed spectrum to the first user equipment device based on the received user equipment capability information, receiving first spectrum availability information at the first wireless base station identifying the spectrum available for use by the first wireless base station.

Method Embodiment 3. The communications method of Method Embodiment 2, further comprising: dividing, by the first wireless base station, the identified spectrum available for use by the first wireless base station into a plurality of bandwidth parts, said plurality of bandwidth parts including at least one bandwidth part of licensed spectrum and at least one bandwidth part of unlicensed spectrum.

Method Embodiment 3A. The communications method of Method Embodiment 3, wherein each bandwidth part of said plurality of bandwidth parts identifies a different contiguous set of resource blocks.

Method Embodiment 3B. The communications method of Method Embodiment 2, wherein the first spectrum availability information includes the identification of spectrum bandwidth parts available for use by the first wireless base station, each of said spectrum bandwidth parts identifying a contiguous set of resource blocks.

Method Embodiment 3B1. The communications method of Method Embodiment 3B, wherein the first spectrum availability information includes both a licensed spectrum bandwidth part and an unlicensed spectrum bandwidth part.

Method Embodiment 4. The communications method of Method Embodiment 3, wherein the first wireless base station and first user equipment device are part of a wireless network which supports bandwidth parts.

Method Embodiment 4A. The communications method of Method Embodiment 4, wherein the first wireless base station is a Citizens Broadband Radio Service Device (CBSD) which is part of a Citizen Broadband Radio Service (CBRS) network being operated by a first service provider; and wherein said licensed spectrum is Priority Access License (PAL) spectrum licensed to said first service provider; and wherein said unlicensed spectrum is General Authorized Access (GAA) spectrum granted for use by a Spectrum Access System of the CBRS network with which the first wireless base station registered.

Method Embodiment 5. The communications method of Method Embodiment 4, wherein said determining, by the first wireless base station, whether to allocate licensed or unlicensed spectrum to the first user equipment device based on the received user equipment capability information further includes determining which licensed or unlicensed bandwidth part spectrum is available for use by the first wireless base station to allocate to the first user equipment device based on a first user equipment capability score and a quality score of the licensed and unlicensed bandwidth part spectrum.

Method Embodiment 6. The communications method of Method Embodiment 5, wherein said user equipment capability information includes one or more of the following: user equipment device type, user equipment device power requirement, dominant traffic type consumed by user equipment device, user equipment hardware capability, user equipment software capability, user equipment device throughput capability, and user equipment device latency requirement.

Method Embodiment 6A. The communications method of Method Embodiment 5, wherein said user equipment capability information includes a user equipment device category from which one or more user equipment capabilities can be derived.

Method Embodiment 6A1. The communications method of Method Embodiment 6A, wherein said one or more user equipment capabilities include one or more of the following: (i) user equipment device type, (ii) user equipment device power requirements, (iii) user equipment device hardware capability, (iv) user equipment device software capabilities, (v) dominant traffic type consumed by the user equipment device, (vi) throughput capability of the user equipment device, (vii) latency requirements of the user equipment device.

Method Embodiment 6B. The communications method of Method Embodiment 6 or 6A1, wherein user equipment device type includes: (i) mobile phone type, (ii) appliance type (e.g., smart home device—thermostat, refrigerator, washer, dryer, television, security system), vehicle, laptop, tablet, smartphone, and computer.

Method Embodiment 6C. The communications method of Method Embodiment 6B, wherein user equipment device power requirements include a high power requirement, a mid-power power requirement, and a low power requirement; and wherein said low power requirement is a power requirement below a first threshold, said high power requirement is a power requirement above a second threshold and a mid-power requirement is a power requirement equal to or greater than the first threshold and less than or equal to the second threshold.

Method Embodiment 6D. The communications method of Method Embodiment 6C, wherein user equipment device hardware capability includes one or more of the following capabilities: (i) single CPU hardware device, (ii) multi-core CPU hardware device, (iii) single Digital Signal Processing device, (iv) multi-core Digital Signal Processing device, (v) single Graphics Processing Unit device, and (vi) multi-core Graphics Processing Unit device, (vii) device hardware release or version.

Method Embodiment 6E. The communications method of Method Embodiment 6D, wherein user equipment software capability includes one or more of the following: software release or version, type of operating system (e.g., iOS, android, release and/or version of device's operating system.

Method Embodiment 6F. The communications method of Method Embodiment 6E, wherein user equipment throughput capability includes: high throughput demand, mid-throughput demand, and low throughput demand; and wherein said low throughput demand is a throughput demand below a first throughput threshold, said high throughput demand is a throughput demand above a second throughput threshold and a mid-throughput demand is a throughput demand equal to or greater than the first throughput threshold and less than or equal to the second throughput threshold.

Method Embodiment 6G. The communications method of Method Embodiment 6F, wherein user equipment latency requirement capability includes a set of latency requirements defined by a set of thresholds which categorize very strict latency requirement devices, strict latency requirement devices, normal latency requirement devices, low latency requirement devices.

Method Embodiment 7. The communications method of Method Embodiment 5, further comprising: generating, by the first wireless base station, the first user equipment capability score based on the user equipment capability information received from the first user equipment device.

Method Embodiment 7A. The communications method of Method Embodiment 7, wherein the first user equipment capability score is a weighted factor sum of values assigned to each of the first user equipment device capabilities included in the user equipment capability information.

Method Embodiment 7B. The communications method of Method Embodiment 7A, wherein generating the first user equipment capability score based on the user equipment capability information received from the first user equipment device includes performing the following summation:

WI user equipment capability 1+W2 user equipment capability 2+W3 user equipment capability 3+W4 user equipment capability 4; wherein user equipment capability 1 is a numerical value assigned to the first user equipment capability included in the user equipment capability information received from the first user equipment device and wherein WI is a numerical value weighting factor assigned for the first user equipment capability; wherein user equipment capability 2 is a numerical value assigned to the second user equipment capability included in the user equipment capability information received from the first user equipment device and wherein W2 is a numerical value weighting factor assigned for the second user equipment capability; wherein user equipment capability 3 is a numerical value assigned to the third user equipment capability included in the user equipment capability information received from the first user equipment device and wherein W3 is a numerical value weighting factor assigned for the third user equipment capability; wherein user equipment capability 4 is a numerical value assigned to the fourth user equipment capability included in the user equipment capability information received from the first user equipment device and wherein W4 is a numerical value weighting factor assigned for the fourth user equipment capability; and wherein the user equipment capability information includes at least four user equipment device capabilities.

Method Embodiment 8. The communications method of Method Embodiment 7, further comprising: generating, by the wireless base station, a quality score of the licensed and unlicensed spectrum bandwidth parts based on a bandwidth part's spectrum type, number of user equipment devices allocated to the bandwidth part by the first wireless base station, and spectrum interference information for the bandwidth part spectrum.

Method Embodiment 8A. The communications method of Method Embodiment 8, wherein the quality score of the licensed and unlicensed bandwidth parts is further based on the number of times that a spectrum bandwidth part has been granted to a base station for use in a geographical area in which the first wireless base station is operating (e.g., by a SAS device (PAL licenses are not granted by SAS devices and are therefore more valuable than GAA granted spectrum as they have less interference due to less base stations using the spectrum, the second most valuable are GAA spectrum that have the lowest number of grants to wireless base stations as that indicates there are less base stations using the spectrum and therefore less interference.

Method Embodiment 9. The communications method of Method Embodiment 8, further comprising: receiving, at the first wireless base station, spectrum interference information for the spectrum available for use by the first wireless base station.

Method Embodiment 10. The communications method of Method Embodiment 1, further comprising: prior to communicating the first spectrum allocation grant to the first user equipment device identifying the allocated spectrum for use by the first user equipment device, allocating bandwidth part spectrum for use by the first user equipment device based on rankings of available spectrum, said available spectrum having been segmented into separate bandwidth parts of contiguous resource blocks and the ranking of the first user equipment device based on the user equipment capability information, and sending bandwidth part configuration information to the user equipment device.

Method Embodiment 10A. The communications method of Method Embodiment 10, wherein said allocating bandwidth part spectrum for use by the first user equipment device based on rankings of available spectrum which has been segmented into separate bandwidth parts of contiguous resource blocks and the user equipment capability information received includes: matching user equipment capability information for the first user equipment device to a bandwidth part spectrum based on the ranking of the bandwidth part spectrum.

Method Embodiment 10B. The communications method of Method Embodiment 10, wherein said ranking of said bandwidth part spectrum is based on spectrum type of bandwidth part, amount of spectrum included in the bandwidth part, number of user equipment devices to which the bandwidth part has been allocated by the wireless base station, spectrum interference information for the bandwidth part.

Method Embodiment 10C. The communications method of Method Embodiment 10B, wherein the spectrum type is priority access license bandwidth type and general authorized access bandwidth type; and wherein bandwidth part spectrum of priority access license bandwidth type is ranked higher than general authorized access bandwidth type.

Method Embodiment 10D. The communications method of Method Embodiment 10C, wherein ranking the bandwidth parts of the spectrum available for use by the first wireless base station includes normalizing different spectrum bandwidth parts when spectrum bandwidth parts of different sizes (e.g., 10 MHz PAL spectrum vs. 20 MHz GAA spectrum) are available for use.

List of Exemplary Numbered System Embodiments

System Embodiment 1. A communication system comprising: a wireless base station including: a memory, and a processor that controls the wireless base station to perform the following operations: receiving user equipment capability information from a first user equipment device; determining whether to allocate licensed or unlicensed spectrum to the first user equipment device based on the received user equipment capability information; and communicating a first spectrum allocation grant to the first user equipment device identifying the allocated spectrum for use by the first user equipment device.

System Embodiment 2. The communication system of System Embodiment 1, wherein said processor further controls the wireless base station to perform the additional operation of: prior to determining whether to allocate licensed or unlicensed spectrum to the first user equipment device based on the received user equipment capability information, receiving first spectrum availability information at the first wireless base station identifying the spectrum available for use by the first wireless base station.

System Embodiment 3. The communications system of System Embodiment 2, wherein the processor further controls the wireless base station to perform the additional operation of: dividing, by the first wireless base station, the identified spectrum available for use by the first wireless base station into a plurality of bandwidth parts, said plurality of bandwidth parts including at least one bandwidth part of licensed spectrum and at least one bandwidth part of unlicensed spectrum.

System Embodiment 3A. The communications system of System Embodiment 3, wherein each bandwidth part of said plurality of bandwidth parts identifies a different contiguous set of resource blocks.

System Embodiment 3B. The communications system of System Embodiment 2, wherein the first spectrum availability information includes the identification of spectrum bandwidth parts available for use by the first wireless base station, each of said spectrum bandwidth parts identifying a contiguous set of resource blocks.

System Embodiment 3B1. The communications system of System Embodiment 3B, wherein the first spectrum availability information includes both a licensed spectrum bandwidth part and an unlicensed spectrum bandwidth part.

System Embodiment 4. The communications system of System Embodiment 3, wherein the wireless base station is part of a wireless network and the first user equipment device which supports bandwidth parts.

System Embodiment 4A. The communications system of System Embodiment 4, wherein the wireless base station is a Citizens Broadband Radio Service Device (CBSD) which is part of a Citizen Broadband Radio Service (CBRS) network being operated by a first service provider; and wherein said licensed spectrum is Priority Access License (PAL) spectrum licensed to said first service provider; and wherein said unlicensed spectrum is General Authorized Access (GAA) spectrum granted for use by a Spectrum Access System of the CBRS network with which the first wireless base station registered.

System Embodiment 5. The communications system of System Embodiment 4, wherein said determining, by the wireless base station, whether to allocate licensed or unlicensed spectrum to the first user equipment device based on the received user equipment capability information further includes determining which licensed or unlicensed bandwidth part spectrum which is available for use by the wireless base station to allocate to the first user equipment device based on a first user equipment capability score and a quality score of the licensed and unlicensed bandwidth part spectrum.

System Embodiment 6. The communications system of System Embodiment 5, wherein said user equipment capability information includes one or more of the following: user equipment device type, user equipment device power requirement, dominant traffic type consumed by user equipment device, user equipment hardware capability, user equipment software capability, user equipment device throughput capability, and user equipment device latency requirement.

System Embodiment 6A. The communications system of System Embodiment 5, wherein said user equipment capability information includes a user equipment device category from which one or more user equipment capabilities can be derived.

System Embodiment 6A1. The communications system of System Embodiment 6A, wherein said one or more user equipment capabilities include one or more of the following: (i) user equipment device type, (ii) user equipment device power requirements, (iii) user equipment device hardware capability, (iv) user equipment device software capabilities, (v) dominant traffic type consumed by the user equipment device, (vi) throughput capability of the user equipment device, (vii) latency requirements of the user equipment device.

System Embodiment 6B. The communications system of System Embodiment 6 or 6A1, wherein user equipment device type includes: (i) mobile phone type, (ii) appliance type (e.g., smart home device—thermostat, refrigerator, washer, dryer, television, security system), vehicle, laptop, tablet, smartphone, and computer.

6C. The communications system of System Embodiment 6B, wherein user equipment device power requirements include a high power requirement, a mid-power power requirement, and a low power requirement; and wherein said low power requirement is a power requirement below a first threshold, said high power requirement is a power requirement above a second threshold and a mid-power requirement is a power requirement equal to or greater than the first threshold and less than or equal to the second threshold.

System Embodiment 6D. The communications system of System Embodiment 6C, wherein user equipment device hardware capability includes one or more of the following capabilities: (i) single CPU hardware device, (ii) multi-core CPU hardware device, (iii) single Digital Signal Processing device, (iv) multi-core Digital Signal Processing device, (v) single Graphics Processing Unit device, and (vi) multi-core Graphics Processing Unit device, (vii) device hardware release or version.

System Embodiment 6E. The communications system of System Embodiment 6D, wherein user equipment software capability includes one or more of the following: software release or version, type of operating system (e.g., iOS, android, release and/or version of device's operating system.

System Embodiment 6F. The communications system of System Embodiment 6E, wherein user equipment throughput capability includes: high throughput demand, mid-throughput demand, and low throughput demand; and wherein said low throughput demand is a throughput demand below a first throughput threshold, said high throughput demand is a throughput demand above a second throughput threshold and a mid-throughput demand is a throughput demand equal to or greater than the first throughput threshold and less than or equal to the second throughput threshold.

System Embodiment 6G. The communications system of System Embodiment 6F, wherein user equipment latency requirement capability includes a set of latency requirements defined by a set of thresholds which categorize very strict latency requirement devices, strict latency requirement devices, normal latency requirement devices, low latency requirement devices.

System Embodiment 7. The communications system of System Embodiment 5, wherein the processor further controls the wireless base station to perform the additional operation of: generating the first user equipment capability score based on the user equipment capability information received from the first user equipment device.

System Embodiment 7A. The communications system of System Embodiment 7, wherein the first user equipment capability score is a weighted factor sum of values assigned to each of the first user equipment device capabilities included in the user equipment capability information.

System Embodiment 7B. The communications method of System Embodiment 7A, wherein generating the first user equipment capability score based on the user equipment capability information received from the first user equipment device includes performing the following summation: W1 user equipment capability 1+W2 user equipment capability 2+W3 user equipment capability 3+W4 user equipment capability 4; wherein user equipment capability 1 is a numerical value assigned to the first user equipment capability included in the user equipment capability information received from the first user equipment device and wherein WI is a numerical value weighting factor assigned for the first user equipment capability; wherein user equipment capability 2 is a numerical value assigned to the second user equipment capability included in the user equipment capability information received from the first user equipment device and wherein W2 is a numerical value weighting factor assigned for the second user equipment capability; wherein user equipment capability 3 is a numerical value assigned to the third user equipment capability included in the user equipment capability information received from the first user equipment device and wherein W3 is a numerical value weighting factor assigned for the third user equipment capability; wherein user equipment capability 4 is a numerical value assigned to the fourth user equipment capability included in the user equipment capability information received from the first user equipment device and wherein W4 is a numerical value weighting factor assigned for the fourth user equipment capability; and wherein the user equipment capability information includes at least four user equipment device capabilities.

System Embodiment 8. The communications system of System Embodiment 7, wherein said generating, by the wireless base station, a quality score of the licensed and unlicensed spectrum bandwidth parts based on a bandwidth part's spectrum type, number of user equipment devices allocated to the bandwidth part by the first wireless base station, and spectrum interference information for the bandwidth part spectrum.

System Embodiment 8A. The communications system of System Embodiment 8, wherein the quality score of the licensed and unlicensed bandwidth parts is further based on the number of times that a spectrum bandwidth part has been granted to a base station for use in a geographical area in which the first wireless base station is operating (e.g., by a SAS device (PAL licenses are not granted by SAS devices and are therefore more valuable than GAA granted spectrum as they have less interference due to less base stations using the spectrum, the second most valuable are GAA spectrum that have the lowest number of grants to wireless base stations as that indicates there are less base stations using the spectrum and therefore less interference.

System Embodiment 9. The communications system of System Embodiment 8, wherein the processor further controls the wireless base station to perform the additional operation of: receiving, at the first wireless base station, spectrum interference information for the spectrum available for use by the first wireless base station.

System Embodiment 10. The communications system of System Embodiment 1, wherein the processor further controls the wireless base station to perform the operations of: prior to communicating the first spectrum allocation grant to the first user equipment device identifying the allocated spectrum for use by the first user equipment device, allocating bandwidth part spectrum for use by the first user equipment device based on rankings of available spectrum, said available spectrum having been segmented into separate bandwidth parts of contiguous resource blocks and the ranking of the first user equipment device based on the user equipment capability information, and sending bandwidth part configuration information to the user equipment device.

System Embodiment 10A. The communications method of System Embodiment 10, wherein said allocating bandwidth part spectrum for use by the first user equipment device based on rankings of available spectrum which has been segmented into separate bandwidth parts of contiguous resource blocks and the user equipment capability information received includes: matching user equipment capability information for the first user equipment device to a bandwidth part spectrum based on the ranking of the bandwidth part spectrum.

System Embodiment 10B. The communications method of System Embodiment 10, wherein said ranking of said bandwidth part spectrum is based on spectrum type of bandwidth part, amount of spectrum included in the bandwidth part, number of user equipment devices to which the bandwidth part has been allocated by the wireless base station, spectrum interference information for the bandwidth part.

System Embodiment 10C. The communications method of System Embodiment 10B, wherein the spectrum type is priority access license bandwidth type and general authorized access bandwidth type; and wherein bandwidth part spectrum of priority access license bandwidth type is ranked higher than general authorized access bandwidth type.

System Embodiment 10D. The communications method of System Embodiment 10C, wherein ranking the bandwidth parts of the spectrum available for use by the first wireless base station includes normalizing different spectrum bandwidth parts when spectrum bandwidth parts of different sizes (e.g., 10 MHz PAL spectrum vs. 20 MHz GAA spectrum) are available for use.

List of Exemplary Numbered Non-transitory Computer Readable Medium Embodiments:

Non-transitory Computer Readable Medium Embodiment 1. A non-transitory computer readable medium including a first set of computer executable instructions which when executed by a processor of a wireless base station cause the wireless base station to perform the steps of: receiving user equipment capability information from a first user equipment device; determining whether to allocate licensed or unlicensed spectrum to the first user equipment device based on the received user equipment capability information; and communicating a first spectrum allocation grant to the first user equipment device identifying the allocated spectrum for use by the first user equipment device.

Non-transitory Computer Readable Medium Embodiment 2. The non-transitory computer readable medium of Non-transitory Computer Readable Medium Embodiment 1, wherein said first set of computer executable instructions which when executed by the processor of the wireless base station further cause the wireless base station to perform the additional step of: prior to determining whether to allocate licensed or unlicensed spectrum to the first user equipment device based on the received user equipment capability information, receiving first spectrum availability information at the first wireless base station identifying the spectrum available for use by the first wireless base station.

Non-transitory Computer Readable Medium Embodiment 3. The non-transitory computer readable medium of Non-transitory Computer Readable Medium Embodiment 2, wherein said first set of computer executable instructions which when executed by the processor of the wireless base station further cause the wireless base station to perform the additional step of: dividing, by the first wireless base station, the identified spectrum available for use by the first wireless base station into a plurality of bandwidth parts, said plurality of bandwidth parts including at least one bandwidth part of licensed spectrum and at least one bandwidth part of unlicensed spectrum.

Non-transitory Computer Readable Medium Embodiment 3A. The non-transitory computer readable medium of Non-transitory Computer Readable Medium Embodiment 3, wherein each bandwidth part of said plurality of bandwidth parts identifies a different contiguous set of resource blocks.

Non-transitory Computer Readable Medium Embodiment 3B. The non-transitory computer readable medium of Non-transitory Computer Readable Medium Embodiment 2, wherein the first spectrum availability information includes the identification of spectrum bandwidth parts available for use by the first wireless base station, each of said spectrum bandwidth parts identifying a contiguous set of resource blocks.

Non-transitory Computer Readable Medium Embodiment 3B1. The non-transitory computer readable medium of Non-transitory Computer Readable Medium Embodiment 3B, wherein the first spectrum availability information includes both a licensed spectrum bandwidth part and an unlicensed spectrum bandwidth part.

Non-transitory Computer Readable Medium Embodiment 4. The non-transitory computer readable medium of Non-transitory Computer Readable Medium Embodiment 3, wherein the wireless base station is part of a wireless network and the first user equipment device which supports bandwidth parts.

Non-transitory Computer Readable Medium Embodiment 4A. The non-transitory computer readable medium of Non-transitory Computer Readable Medium Embodiment 4, wherein the wireless base station is a Citizens Broadband Radio Service Device (CBSD) which is part of a Citizen Broadband Radio Service (CBRS) network being operated by a first service provider; and wherein said licensed spectrum is Priority Access License (PAL) spectrum licensed to said first service provider; and wherein said unlicensed spectrum is General Authorized Access (GAA) spectrum granted for use by a Spectrum Access System of the CBRS network with which the first wireless base station registered.

Non-transitory Computer Readable Medium Embodiment 5. The non-transitory computer readable medium of Non-transitory Computer Readable Medium Embodiment 4, wherein said determining, by the wireless base station, whether to allocate licensed or unlicensed spectrum to the first user equipment device based on the received user equipment capability information further includes determining which licensed or unlicensed bandwidth part spectrum which is available for use by the wireless base station to allocate to the first user equipment device based on a first user equipment capability score and a quality score of the licensed and unlicensed bandwidth part spectrum.

Non-transitory Computer Readable Medium Embodiment 6. The non-transitory computer readable medium of Non-transitory Computer Readable Medium Embodiment 5, wherein said user equipment capability information includes one or more of the following: user equipment device type, user equipment device power requirement, dominant traffic type consumed by user equipment device, user equipment hardware capability, user equipment software capability, user equipment device throughput capability, and user equipment device latency requirement.

Non-transitory Computer Readable Medium Embodiment 6A. The non-transitory computer readable medium of Non-transitory Computer Readable Medium Embodiment 5, wherein said user equipment capability information includes a user equipment device category from which one or more user equipment capabilities can be derived.

Non-transitory Computer Readable Medium Embodiment 6A1. The non-transitory computer readable medium of Non-transitory Computer Readable Medium Embodiment 6A, wherein said one or more user equipment capabilities include one or more of the following: (i) user equipment device type, (ii) user equipment device power requirements, (iii) user equipment device hardware capability, (iv) user equipment device software capabilities, (v) dominant traffic type consumed by the user equipment device, (vi) throughput capability of the user equipment device, (vii) latency requirements of the user equipment device.

The techniques of various embodiments may be implemented using software, hardware and/or a combination of software and hardware. Various embodiments are directed to apparatus, e.g., wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, Policy Control Function nodes/devices, Session Management Function nodes/devices, subscriber devices, servers, nodes and/or elements. Various embodiments are also directed to methods, e.g., method of controlling and/or operating wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, Policy Control Function nodes/devices, Session Management Function nodes/devices, subscriber devices, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, Policy Control Function nodes/devices, Session Management Function nodes/devices, subscriber devices, servers, nodes and/or elements described herein are implemented using one or more components to perform the steps corresponding to one or more methods, for example, ranking, scoring, generating, segmenting bandwidth, allocating bandwidth parts, establishing connections, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, Policy Control Function nodes/devices, Session Management Function nodes/devices, subscriber devices, servers, nodes and/or elements are configured to perform the steps of the methods described as being performed by the wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, Policy Control Function nodes/devices, Session Management Function nodes/devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, Policy Control Function nodes/devices, Session Management Function nodes/devices, subscriber devices, servers, nodes and/or elements, with a processor which includes a component corresponding to each of the steps of the various described methods performed by the device in which the processor is included. In some but not all embodiments a device, e.g., wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, Policy Control Function nodes/devices, Session Management Function nodes/devices, subscriber devices, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, Policy Control Function nodes/devices, Session Management Function nodes/devices, subscriber devices, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, Policy Control Function nodes/devices, Session Management Function nodes/devices, subscriber devices, servers, nodes and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:
   receiving, at a first wireless base station from a Spectrum Access System, first spectrum availability information identifying Priority Access License (PAL) spectrum and General Availability Access (GAA) spectrum available for use by the first wireless base station;
   receiving user equipment capability information at the first wireless base station from a first user equipment device;
   determining, by the first wireless base station, which spectrum bandwidth parts of a plurality of PAL and GAA spectrum bandwidth parts corresponding to the identified PAL spectrum and GAA spectrum available for use by the first wireless base station to allocate to the first user equipment device based on the received user equipment capability information; and
   wherein the first wireless base station and the first user equipment device are part of a wireless network which supports bandwidth parts.

2. The communications method of claim 1, further comprising:
   communicating, by the first wireless base station, a first spectrum allocation grant to the first user equipment device identifying the determined allocated spectrum bandwidth parts for use by the first user equipment device.

3. The communications method of claim 2,
   wherein determining, by the first wireless base station, which spectrum bandwidth parts of the plurality of PAL and GAA spectrum bandwidth parts corresponding to the identified PAL spectrum and GAA spectrum available for use by the first wireless base station to allocate to the first user equipment device is further based on a quality score of the PAL and GAA spectrum bandwidth parts.

4. The communications method of claim 3, further comprising:
generating, by the wireless base station, the quality score of the PAL and GAA spectrum bandwidth parts based on a bandwidth part's spectrum type, number of user equipment devices allocated to the bandwidth part by the first wireless base station, and spectrum interference information for the bandwidth part spectrum.

5. The communications method of claim 4, further comprising:
receiving, at the first wireless base station, spectrum interference information for the spectrum available for use by the first wireless base station.

6. The communications method of claim 1,
wherein the first spectrum availability information identifying the PAL spectrum and GAA spectrum available for use by the first wireless base station includes: information identifying the PAL spectrum bandwidth parts and the GAA spectrum bandwidth parts available for use by the first wireless base station.

7. The communications method of claim 1, further comprising:
dividing, by the first wireless base station, the PAL and GAA spectrum identified as available for use by the first wireless base station into the plurality of PAL and GAA spectrum bandwidth parts.

8. The communications method of claim 7,
wherein each spectrum bandwidth part of the plurality of PAL and GAA spectrum bandwidth parts identifies a contiguous set of resource blocks.

9. The communications method of claim 1,
wherein said user equipment capability information includes: user equipment device power requirement information for the first user equipment device, dominant traffic type consumed information for the first user equipment device, user equipment device throughput capability information for the first user equipment device, and user equipment device latency requirements information for the first user equipment device; and
wherein said determining, by the first wireless base station, which spectrum bandwidth parts of a plurality of PAL and GAA spectrum bandwidth parts corresponding to the identified PAL spectrum and GAA spectrum available for use by the first wireless base station to allocate to the first user equipment device based on the received user equipment capability information includes: using said user equipment device power requirement information for the first user equipment device, said dominant traffic type consumed information for the first user equipment device, said user equipment device throughput capability information for the first user equipment device, and said user equipment device latency requirements information for the first user equipment device in determining which spectrum bandwidth parts of the plurality of PAL and GAA spectrum bandwidth parts corresponding to the identified PAL spectrum and GAA spectrum available for use by the first wireless base station to allocate to the first user equipment device.

10. The communications method of claim 1,
wherein the wireless network is a Citizens Broadband Radio Service (CBRS) network; and
wherein the first wireless base station is a Citizens Broadband Radio Service Device (CBSD).

11. A communication system comprising:
a first wireless base station including:
memory, and
a processor that controls the first wireless base station to perform the following operations:
receiving, at the first wireless base station from a Spectrum Access System, first spectrum availability information identifying Priority Access License (PAL) spectrum and General Availability Access (GAA) spectrum available for use by the first wireless base station;
receiving user equipment capability information at the first wireless base station from a first user equipment device;
determining, by the first wireless base station, which spectrum bandwidth parts of a plurality of PAL and GAA spectrum bandwidth parts corresponding to the identified PAL spectrum and GAA spectrum available for use by the first wireless base station to allocate to the first user equipment device based on the received user equipment capability information; and
wherein the first wireless base station and the first user equipment device are part of a wireless network which supports bandwidth parts.

12. The communications system of claim 11, wherein said processor further controls the first wireless base station to perform the following additional operation:
communicating, by the first wireless base station, a first spectrum allocation grant to the first user equipment device identifying the determined allocated spectrum bandwidth parts for use by the first user equipment device.

13. The communications system of claim 12,
wherein determining, by the first wireless base station, which spectrum bandwidth parts of the plurality of PAL and GAA spectrum bandwidth parts corresponding to the identified PAL spectrum and GAA spectrum available for use by the first wireless base station to allocate to the first user equipment device is further based on a quality score of the PAL and GAA spectrum bandwidth parts.

14. The communications system of claim 13, wherein said processor further controls the first wireless base station to perform the following additional operation:
generating, by the first wireless base station, the quality score of the PAL and GAA spectrum bandwidth parts based on a bandwidth part's spectrum type, number of user equipment devices allocated to the bandwidth part by the first wireless base station, and spectrum interference information for the bandwidth part spectrum.

15. The communications system of claim 14, wherein said processor further controls the first wireless base station to perform the following additional operation:
receiving, at the first wireless base station, spectrum interference information for the spectrum available for use by the first wireless base station.

16. The communications system of claim 11,
wherein the first spectrum availability information identifying the PAL spectrum and GAA spectrum available for use by the first wireless base station includes: information identifying the PAL spectrum bandwidth parts and the GAA spectrum bandwidth parts available for use by the first wireless base station.

17. The communications system of claim 11, wherein said processor further controls the first wireless base station to perform the following additional operation:
   dividing, by the first wireless base station, the PAL and GAA spectrum identified as available for use by the first wireless base station into the plurality of PAL and GAA spectrum bandwidth parts.

18. The communications system of claim 17,
   wherein each spectrum bandwidth part of the plurality of PAL and GAA spectrum bandwidth parts identifies a contiguous set of resource blocks.

19. The communications system of claim 11,
   wherein the wireless network is a Citizens Broadband Radio Service (CBRS) network; and
   wherein the first wireless base station is a Citizens Broadband Radio Service Device (CBSD).

20. A non-transitory computer readable medium including a first set of computer executable instructions which when executed by a processor of a first wireless base station cause the first wireless base station to perform the steps of:
   receiving, at the first wireless base station from a Spectrum Access System, first spectrum availability information identifying Priority Access License (PAL) spectrum and General Availability Access (GAA) spectrum available for use by the first wireless base station;
   receiving user equipment capability information at the first wireless base station from a first user equipment device;
   determining, by the first wireless base station, which spectrum bandwidth parts of a plurality of PAL and GAA spectrum bandwidth parts corresponding to the identified PAL spectrum and GAA spectrum available for use by the first wireless base station to allocate to the first user equipment device based on the received user equipment capability information; and
   wherein the first wireless base station and the first user equipment device are part of a wireless network which supports bandwidth parts.

\* \* \* \* \*